United States Patent
Agrawal et al.

(10) Patent No.: US 12,079,272 B2
(45) Date of Patent: Sep. 3, 2024

(54) DISTRIBUTED VIDEO STORAGE AND SEARCH WITH EDGE COMPUTING

(71) Applicant: NETRADYNE, INC., San Diego, CA (US)

(72) Inventors: Avneesh Agrawal, Bengaluru (IN); David Jonathan Julian, San Diego, CA (US); Venkata Sreekanta Reddy Annapureddy, San Diego, CA (US); Manoj Venkata Tutika, Bengaluru (IN); Vinay Kumar Rai, Bengaluru (IN); Sandeep Pandya, San Diego, CA (US); Adam David Kahn, San Diego, CA (US); Michael Campos, La Jolla, CA (US); Badugu Naveen Chakravarthy, Bengaluru (IN); Ankur Nigam, Bengaluru (IN); Praveen Kumar, Bengaluru (IN); Tejeswara Rao Gudena, Bengaluru (IN); Karan Kishore, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 752 days.

(21) Appl. No.: 17/187,503

(22) Filed: Feb. 26, 2021

(65) Prior Publication Data
US 2021/0191979 A1    Jun. 24, 2021

Related U.S. Application Data

(63) Continuation of application No. 16/324,217, filed as application No. PCT/US2017/045932 on Aug. 8, 2017, now Pat. No. 10,970,333.

(Continued)

(51) Int. Cl.
G06F 16/783    (2019.01)
B60W 40/09    (2012.01)
(Continued)

(52) U.S. Cl.
CPC ........ *G06F 16/7837* (2019.01); *B60W 40/09* (2013.01); *G06F 16/00* (2019.01);
(Continued)

(58) Field of Classification Search
CPC .. G06F 16/7837; G06F 16/7844; G06F 16/71; G06V 20/597; G06V 20/48; B60W 40/09; G06N 20/00
See application file for complete search history.

(56) References Cited

U.S. PATENT DOCUMENTS 8,515,212 B1    8/2013    Bengio et al.
9,147,353 B1    9/2015    Slusar
(Continued)

FOREIGN PATENT DOCUMENTS

WO    2012150591 A2    11/2012

OTHER PUBLICATIONS

First Office Action in CN Patent Application No. 201780062236.X dated Dec. 2, 2022 (12 pages) (no English translation available).
(Continued)

*Primary Examiner* — Girumsew Wendmagegn
(74) *Attorney, Agent, or Firm* — NETRADYNE, INC.

(57) ABSTRACT

Systems and methods are provided for distributed video storage and search with edge computing. The method may comprise caching a first portion of data on a first device. The method may further comprise determining, at a second device, whether the first device has the first portion of data. The determining may be based on whether the first piece of data satisfies a specified criterion. The method may further
(Continued)

comprise sending the data, or a portion of the data, and/or a representation of the data from the first device to a third device.

19 Claims, 17 Drawing Sheets

Related U.S. Application Data

(60) Provisional application No. 62/468,894, filed on Mar. 8, 2017, provisional application No. 62/372,284, filed on Aug. 8, 2016.

(51) Int. Cl.
*G06F 16/00* (2019.01)
*G06F 16/71* (2019.01)
*G06F 16/73* (2019.01)
*G06V 20/40* (2022.01)
*G06V 20/59* (2022.01)
*G06N 20/00* (2019.01)

(52) U.S. Cl.
CPC .............. *G06F 16/71* (2019.01); *G06F 16/73* (2019.01); *G06F 16/7844* (2019.01); *G06V 20/48* (2022.01); *G06V 20/597* (2022.01); *G06N 20/00* (2019.01)

(56) References Cited

U.S. PATENT DOCUMENTS

| | | | |
|---|---|---|---|
| 10,346,464 | B2 | 7/2019 | Ye |
| 2002/0073086 | A1 | 6/2002 | Thompson et al. |
| 2005/0162687 | A1 | 7/2005 | Lee |
| 2010/0260426 | A1 | 10/2010 | Huang et al. |
| 2010/0309226 | A1 | 12/2010 | Quack et al. |
| 2012/0170902 | A1 | 7/2012 | Zhu et al. |
| 2012/0201041 | A1 | 8/2012 | Gergets et al. |
| 2013/0330055 | A1 | 12/2013 | Zimmermann et al. |
| 2013/0332004 | A1 | 12/2013 | Gompert et al. |
| 2014/0250115 | A1 | 9/2014 | Yang |
| 2014/0331167 | A1 | 11/2014 | Kasterstein et al. |
| 2014/0333794 | A1 | 11/2014 | Rhoads et al. |
| 2015/0067471 | A1 | 3/2015 | Bhardwaj et al. |
| 2015/0183372 | A1 | 7/2015 | Lambert et al. |
| 2015/0213056 | A1 | 7/2015 | Maluf et al. |
| 2015/0286894 | A1 | 10/2015 | Cho et al. |
| 2015/0312341 | A1* | 10/2015 | Smith .................. H04N 5/781 709/213 |
| 2016/0275352 | A1 | 9/2016 | Rajappa et al. |
| 2017/0109609 | A1 | 4/2017 | Hill et al. |
| 2017/0132687 | A1 | 5/2017 | Kim et al. |
| 2017/0177978 | A1 | 6/2017 | Narasimha et al. |
| 2017/0235768 | A1 | 8/2017 | Amrutkar et al. |
| 2017/0242875 | A1 | 8/2017 | Jiang et al. |
| 2017/0287444 | A1 | 10/2017 | Masuda |
| 2018/0018390 | A1 | 1/2018 | Zhang et al. |
| 2018/0260401 | A1 | 9/2018 | Agrawal et al. |
| 2018/0341706 | A1 | 11/2018 | Agrawal et al. |
| 2019/0278440 | A1 | 9/2019 | Drory et al. |

OTHER PUBLICATIONS

Extended European Search Report for EP Patent Application No. 17840151.9, mailed Jan. 29, 2020.
International Search Report and Written Opinion for PCT Patent Application No. PCT/US2017/045932, mailed Oct. 30, 2017, 9 pages.

* cited by examiner

Figure 6:
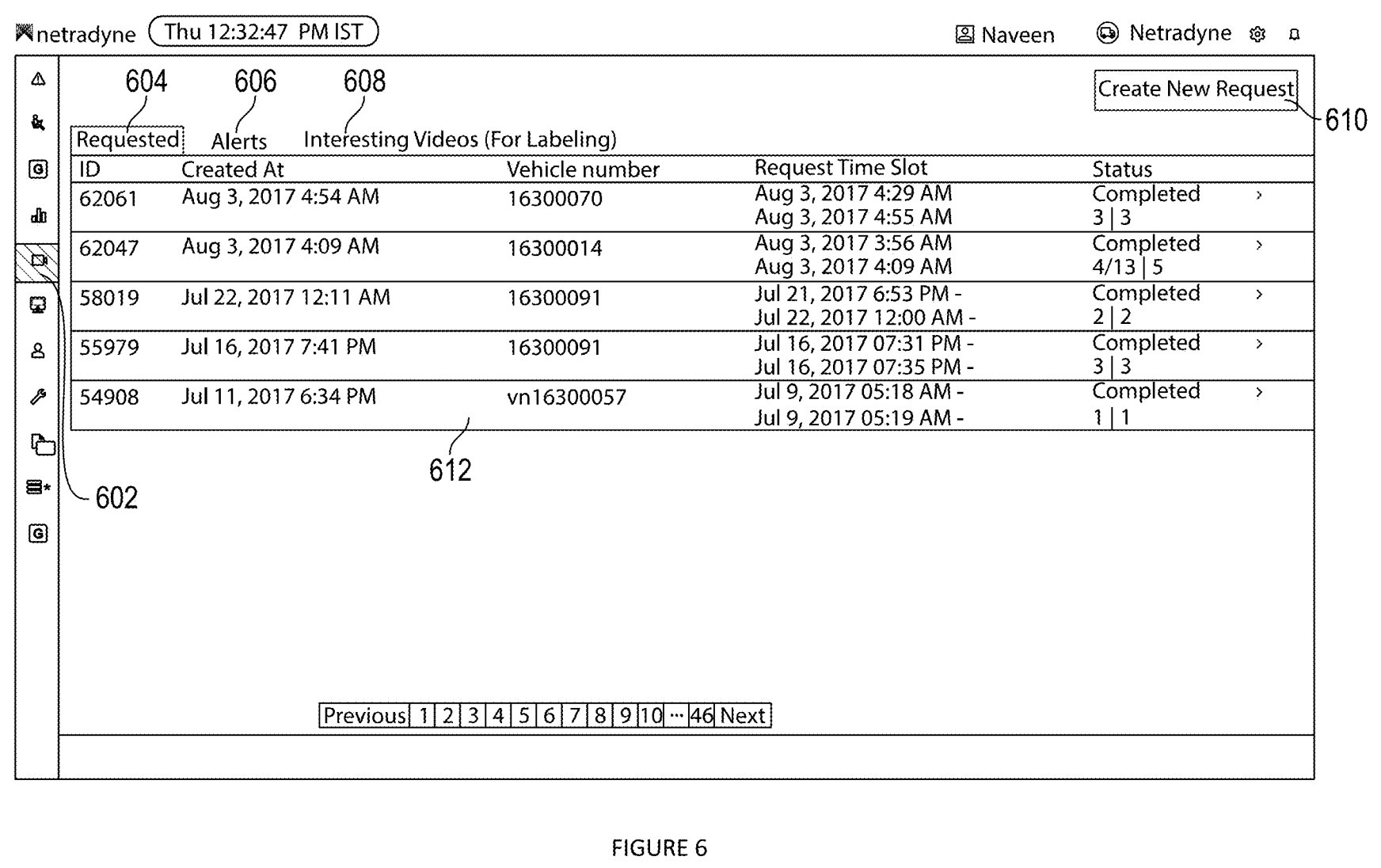

▼ netradyne   Thu 12:32:47 PM IST                                          ▣ Naveen   ⊙ Netradyne ⚙

604   606   608
Requested   Alerts   Interesting Videos (For Labeling)                    [Create New Request] — 610

| ID | Created At | Vehicle number | Request Time Slot | Status |
|---|---|---|---|---|
| 62061 | Aug 3, 2017 4:54 AM | 16300070 | Aug 3, 2017 4:29 AM - Aug 3, 2017 4:55 AM | Completed 3\|3 |
| 62047 | Aug 3, 2017 4:09 AM | 16300014 | Aug 3, 2017 3:56 AM - Aug 3, 2017 4:09 AM | Completed 4/13\|5 |
| 58019 | Jul 22, 2017 12:11 AM | 16300091 | Jul 21, 2017 6:53 PM - Jul 22, 2017 12:00 AM | Completed 2\|2 |
| 55979 | Jul 16, 2017 7:41 PM | 16300091 | Jul 16, 2017 07:31 PM - Jul 16, 2017 07:35 PM | Completed 3\|3 |
| 54908 | Jul 11, 2017 6:34 PM | vn16300057 | Jul 9, 2017 05:18 AM - Jul 9, 2017 05:19 AM | Completed 1\|1 |

602

Previous 1 2 3 4 5 6 7 8 9 10 ... 46 Next

DISTRIBUTED VIDEO STORAGE AND SEARCH WITH EDGE COMPUTING

CROSS-REFERENCE TO RELATED APPLICATION

The present application is a Continuation Application of U.S. application Ser. No. 16/324,217 filed Feb. 8, 2019, which is a U.S. National Stage Application of International Application No. PCT/US2017/045932 filed Aug. 8, 2017, which designates the United States, and which claims the benefit of U.S. Provisional Patent Application No. 62/372,284 filed on 8 Aug. 2016, and titled, "ANALYTICS-BASED QUERIES FOR CONNECTED DEVICES WITH STORAGE", and U.S. Provisional Patent Application No. 62/468,894, filed on the 8 Mar. 2017, and titled, "DISTRIBUTED VIDEO SEARCH WITH EDGE COMPUTING", the disclosures of which are each expressly incorporated by reference in its entirety.

BACKGROUND

Field

Certain aspects of the present disclosure generally relate to internet-of-things (IOT) applications, and more particularly, to systems and methods of distributed video storage and search with edge computing.

Background

Internet-of-things (IOT) applications may include embedded machine vision for intelligent driver monitoring systems (IDMS), advanced driving assistance systems (ADAS), autonomous driving systems, camera-based surveillance systems, smart cities, and the like. A user of IOT systems may desire, for example, access to all of the data captured by the sensors of one or multiple connected devices.

In IOT applications there may be bandwidth and backhaul limitations. Furthermore, there may be data accessibility challenges due to the bandwidth and backhaul limitations of data transmission networks. In addition, there may be storage limitations in connected devices and/or centralized servers.

The present disclosure is directed to methods that may overcome challenges associated with searching data captured by one or more connected devices. The challenges include bandwidth, backhaul, and storage limitations. Furthermore, the present disclosure is directed to systems and methods of data transmission and/or retrieval.

SUMMARY

Certain aspects of the present disclosure generally relate to providing, implementing, and using a method of distributed video storage and search with edge computing, including analytics-based queries for connected devices with storage. The method may comprise caching a first data on a first device. The method may further comprise a second device determining whether the first device has the first data. The method may further comprise sending the data, or a portion of the data, and/or a representation of the data from the first device to the second device and/or to another device.

In addition, certain aspects of the present disclosure provide systems and methods for smart queries. Some embodiments may include intelligent pre-selection. In addition, certain aspects of the present disclosure provide systems and methods for variable rate throughput of deep neural networks. In addition, certain aspects of the present disclosure provide systems and methods for random packet drop. In addition, certain aspects of the present disclosure provide systems and methods for data access. Some embodiments may include retrieval of video data.

Certain aspects of the present disclosure generally relate to providing, implementing, and using a method of distributed video search with edge computing. A method in accordance with certain aspects of the present disclosure may include receiving video data, receiving a search query, determining a relevance of the video data based on the search query, and transmitting the video data based on the determined relevance. A method in accordance with certain aspects of the present disclosure may also include distributed image search or distributed search over visual data and associated data from another modality. Accordingly, bandwidth, compute, and memory resource utilization may be decreased. In addition, security and privacy of visual data may be substantially protected.

Certain aspects of the present disclosure provide a method. The method generally includes receiving visual data from a camera at a first device wherein the first device is proximate to the camera; storing the visual data at a memory of the first device; processing the visual data at the first device to produce an inference data; transmitting the inference data to a second device; receiving a search query at the second device; determining, at the second device, a relevance of the visual data based on the search query and the inference data; and transmitting the visual data from the first device to the second device based on the determined relevance.

Certain aspects of the present disclosure provide a method. The method generally includes receiving a visual data from a camera at a first device wherein the first device is proximate to the camera; storing the visual data at a memory of the first device; receiving a search query at a second device; transmitting the search query from the second device to the first device; and determining, at the first device, a relevance of the visual data at the first device based on the visual data and the search query.

Certain aspects of the present disclosure provide an apparatus configured to perform a visual search. The apparatus generally includes a first memory unit; a first at least one processor coupled to the first memory unit, in which the first at least one processor is configured to: receive a visual data from a camera; store the visual data at the first memory unit; process the visual data to produce an inference data; and transmit the inference data to a second memory unit. The apparatus also includes: a second at least one processor coupled to the second memory unit, in which the second at least one processor is configured to: receive a search query; determine a relevance of the visual data based on the search query and the inference data; and request that the first device transmit the visual data from the first memory unit to the second memory unit based on the determined relevance.

Certain aspects of the present disclosure provide an apparatus configured to perform a visual search. The apparatus generally includes means for receiving a visual data from a camera at a first device, wherein the first device is proximate to the camera; means for storing the visual data at the first device; means for processing the visual data to produce an inference data; means for transmitting the inference data; means for receiving a search query at a second device; means for determining, at the second device, a relevance of the visual data based on the search query and the inference data; and means for requesting that the first device transmit the visual data based on the determined relevance.

Certain aspects of the present disclosure provide a computer program product for visual search. The computer program product generally includes a non-transitory computer-readable medium having program code recorded thereon, the program code comprising program code to: receive a visual data at a first device; store the visual data at a memory of the first device; process the visual data at the first device to produce an inference data; transmit the inference data to a second device; receive a search query at the second device; determine a relevance of the visual data based on the search query and the inference data; and transmit the visual data from the first device to the second device based on the determined relevance.

Certain aspects of the present disclosure provide an apparatus configured to perform a visual search. The apparatus generally includes a second memory unit; a second at least one processor coupled to the second memory unit, in which the second at least one processor is configured to: receive a search query; and transmit the search query to a first memory unit. The apparatus also includes a first memory unit; and a first at least one processor coupled to the first memory unit, in which the first at least one processor is configured to: receive visual data from a proximate camera; store the visual data at the first memory unit; and determine a relevance of the visual data at the first device based on the visual data and the search query.

Certain aspects of the present disclosure provide an apparatus configured to perform a visual search. The apparatus generally includes means for receiving a visual data from a camera at a first device, wherein the first device is proximate to the camera; means for receiving a search query at a second device; means for transmitting the search query from the second device to the first device; and means for determining, at the first device, a relevance of the visual data based on the visual data and the search query.

Certain aspects of the present disclosure provide a computer program product. The computer program product generally includes a non-transitory computer-readable medium having program code recorded thereon, the program code comprising program code to: receive visual data from a camera at a first device, wherein the first device is proximate to the camera; receive a search query at a second device; transmit the search query from the second device to the first device; and determine, at the first device, a relevance of the visual data based on the visual data and the search query.

Certain aspects of the present disclosure provide a computer program product. The computer program product generally includes a non-transitory computer-readable medium having program code recorded thereon, the program code comprising program code to: receive visual data from a camera at a first device, wherein the first device is proximate to the camera; store the visual data to a memory at the first device; receive a search query at a second device; determine, at the second device, whether the first device has stored the visual data in the memory storage; and transmit the visual data from the first device to the second device.

BRIEF DESCRIPTION OF DRAWINGS

FIG. 6 illustrates an example of distributed video storage and search with edge computing in accordance with certain aspects of the present disclosure.

FIG. 9 illustrates an example of distributed video storage and search with edge computing in accordance with certain aspects of the present disclosure.

FIG. 10 illustrates an example of distributed video storage and search with edge computing in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Query-Specific Models

Figure 1A:
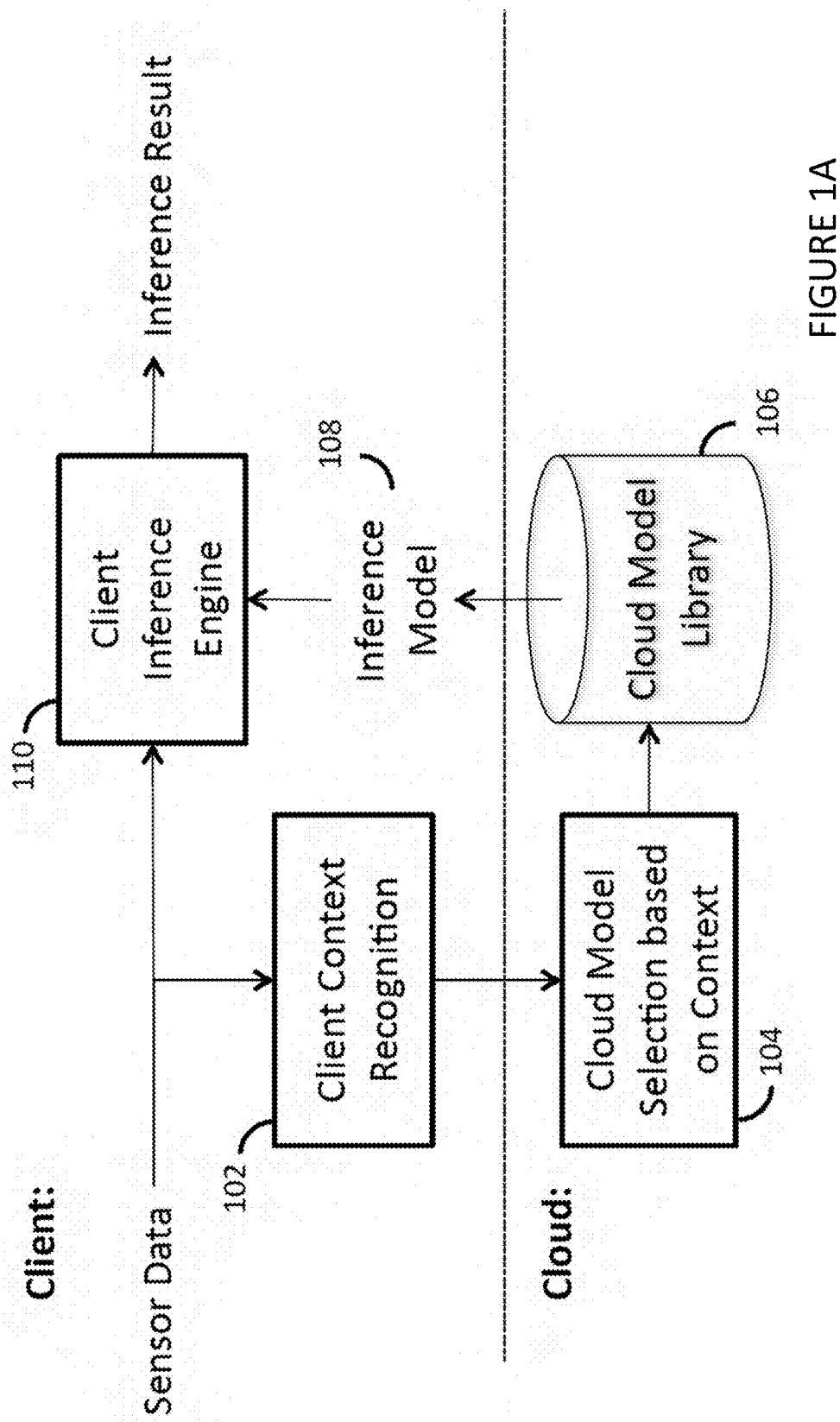
FIG. 1A illustrates an example of distributed video storage and search with edge computing in accordance with certain aspects of the present disclosure.

FIG. 1A illustrates an example implementation of the aforementioned method of distributed video storage and search with edge computing in accordance with certain aspects of the present disclosure. As illustrated in FIG. 1A, processing performed on the embedded client 102 may provide context metadata to the cloud. Based on the received metadata from the client, the cloud may select 104 a context specific model from a cloud model library 106 which may be based, in part, on a user defined query. The cloud may then communicate back a context specific inference model 108 for the client to use for embedded processing in a client inference engine 110.

Figure 1B:
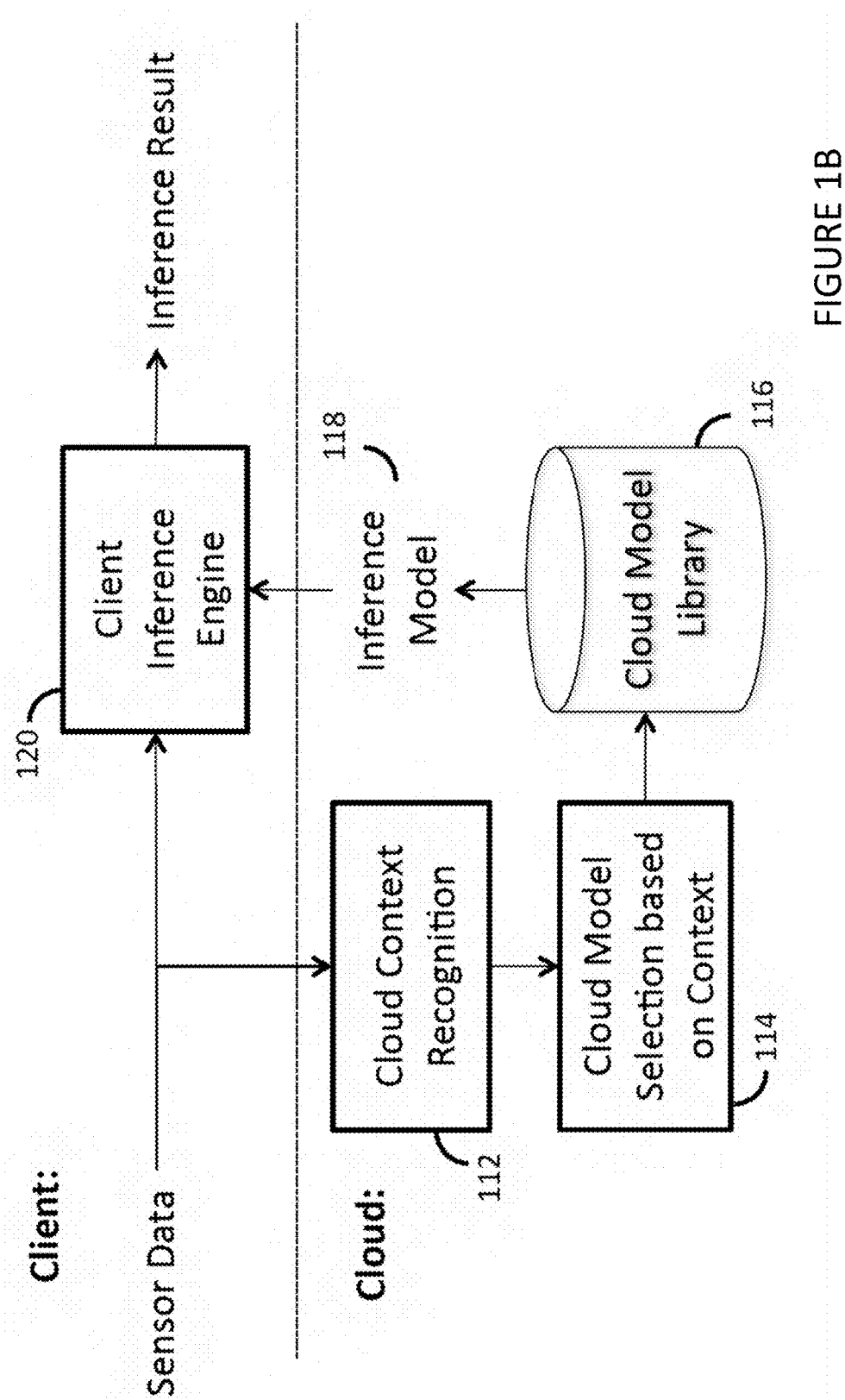
FIG. 1B illustrates an example of distributed video storage and search with edge computing in accordance with certain aspects of the present disclosure.

In an alternative embodiment, as illustrated in FIG. 1B, the client may provide data to the cloud and the cloud may determine the client's context 112. Based on the context inferred from data provided by the client, the cloud may select 114 a context specific model from a cloud model library 116. The cloud may then communicate back a context specific inference model 118 for the client to use for real-time processing in a client inference engine 120.

In an exemplary embodiment of the aforementioned systems and methods of distributed video storage and search with edge computing, a vision system (such as a car or drone machine vision system that is part of an advanced driving assistance system (ADAS) or auto-pilot system, or a drone or other embedded analytics system including fixed camera system) may be configured to process a general purpose model or set of models for recognizing objects of interest. A general-purpose model may be a model that has been designed or trained to operate in any context or in a wide range of typical contexts. The processing of a general-purpose model may provide the client device with a basic level of performance. Furthermore, the general-purpose model may be processed on the embedded computing device so that the machine may operate if the device does not have a reliable connection to the cloud. As a result of processing various sensor and user profile inputs, including camera, inertial sensors, GPS/GLASNOSS, microphone, user inputs, engine data, barometric pressure, and other data, the client or cloud may recognize the client's context. In an exemplary embodiment, the cloud may use the recognized context to determine a context specific model, and then send the client the context specific model to improve key performance indicators in that context such as accuracy and latency, and/or to help determine if the device memory storage contains data that matches a query of a user.

Although FIGS. 1A-B show that the context may be inferred from sensor data, the present disclosure is not so limiting, and instead the context may be based on a number of inputs including processing of sensor data including cameras, inertial sensors, GPS, light sensors, barometers, temperature, LIDAR, and sonar; based on weather determined either from sensors or cloud sources such as weather reporting sites, map geography, and so forth. Furthermore, the context may be determined based on the computational resources available on the client as well as latency requirements on the embedded system.

In another embodiment of the aforementioned method of distributed video storage and search with edge computing, context recognition may be based on the output of the inference engine, rather than the sensor data directly, or based on a combination of the sensor data and the output of the inference engine on the device.

Joint Client and Cloud Processing

Figure 1C:
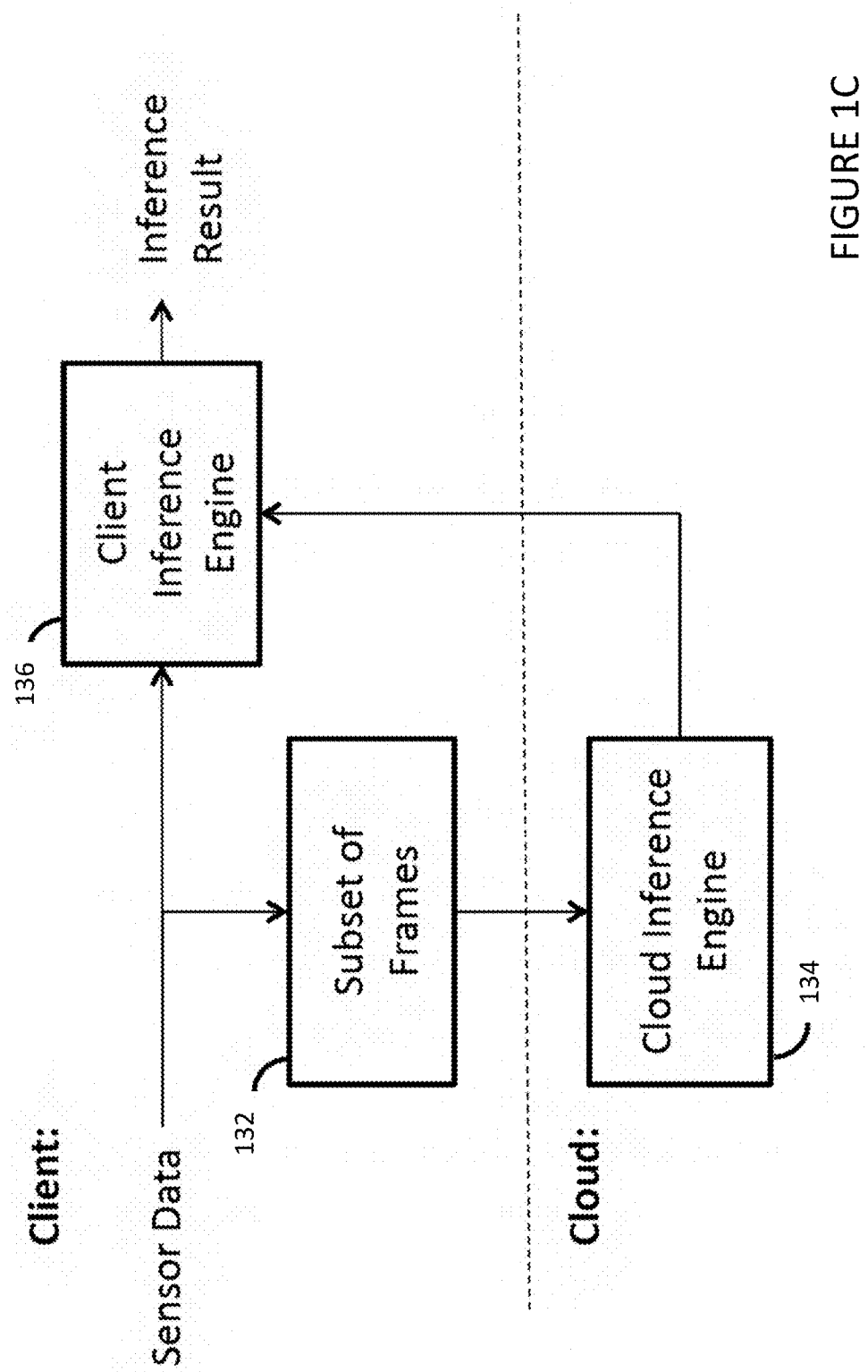
FIG. 1C illustrates an example of distributed video storage and search with edge computing in accordance with certain aspects of the present disclosure.

According to aspects of the present disclosure, the client and cloud may jointly process the data obtained at the client device. FIG. 1C illustrates a method of distributed video storage and search with edge computing. The sensor data may be segmented into a subset of frames 132. The subset of frames may be sent to the cloud where it may be processed by a cloud inference engine 134. The results of the cloud inference engine may then be sent back to the client device. Concurrently, the sensor data obtained on the device may be processed locally at a client inference engine 136. The results from the cloud may be combined with the results of the inference engine on the client device to obtain the inference results that may be used by the client device. In the present example, the cloud may provide additional computation resources to those at the client. There may be a latency penalty associated with the inference result from the client. Several methods of leveraging the additional computational resources of the cloud are contemplated, as described in PCT application PCT/US16/58723—"Joint Processing for Embedded Data Inference", filed 25 Oct. 2016, which is incorporated herein by reference in its entirety.

According to certain aspects of the present disclosure, metadata and/or observations data may be sent from the client to the cloud. The metadata may include sensor data, which may include GPS data corresponding to the location of the device. The observation data may include descriptors of objects that were detected in the visual data by an inference engine on the client device. In some embodiments, the metadata and/or observation data may be processed by a device in the cloud. The additional processing by a device in the cloud may be referred to as second pass analytics. In one example, a second pass analytics module may determine if the metadata and/or observation data satisfy a criterion for 'interesting' data. In another example, the device on the cloud may determine a probability that the metadata and/or observation data corresponds to an 'interesting' video stored on the client device.

According to certain aspects, a cloud device may query weather data periodically, such as every 10 minutes. In one example, the client device may be configured to upload metadata and observation data every 10 minutes. In this example, a cloud device may determine that there are one or more weather stations in the vicinity of the client device, based on location information transmitted in the metadata. Even though the metadata and observation data may not have triggered an "interesting" message based on the inference engine at the device, the weather query may reveal that the client is located in an area with "interesting" weather. If so, the client may identify one or more video data files that are interesting. Alternatively, a client may assign a probability that one or more video data files are interesting based on a local determination of weather.

By assigning a probability that a video is interesting, a system may spread out retrieval of interesting videos over a period of time. For example, if there is a desire to capture 300 videos of driving in rainy weather over a 30-day period, the probabilities may be set so that approximately 10 such videos are uploaded per day. If actual weather conditions yield a lower number of uploaded videos, the probability may be increased over the course of the 30-day period. Likewise, if the number of uploaded videos is ahead of schedule, the probability may be decreased.

Whether a video is 'interesting' may be determined based on a number of considerations. For example, a video may be 'interesting' if it is rare. Video data associated with rare weather events may be interesting. In some embodiments, a fleet manager or the like may specify type of driving behaviors or driving conditions that are 'interesting'. In addition to specifying different kinds of interesting videos, a fleet manager may allocate a certain bandwidth budget to interesting videos or specific kinds of interesting videos. For example, a fleet manager may identify rain as a first 'interesting' class and snow as a second 'interesting' class. If drivers in his fleet encounter several days of rain, the number of retrieved interesting videos including rain may be high. Accordingly, the probability of retrieving videos captured during rainstorms may be decreased. Likewise, the system may maintain or increase the probability of retrieving videos captured during snowstorms, as may be warranted based on the remaining allocation of bandwidth for videos containing snow.

Vehicle Mounted Camera Device

Figure 2A:
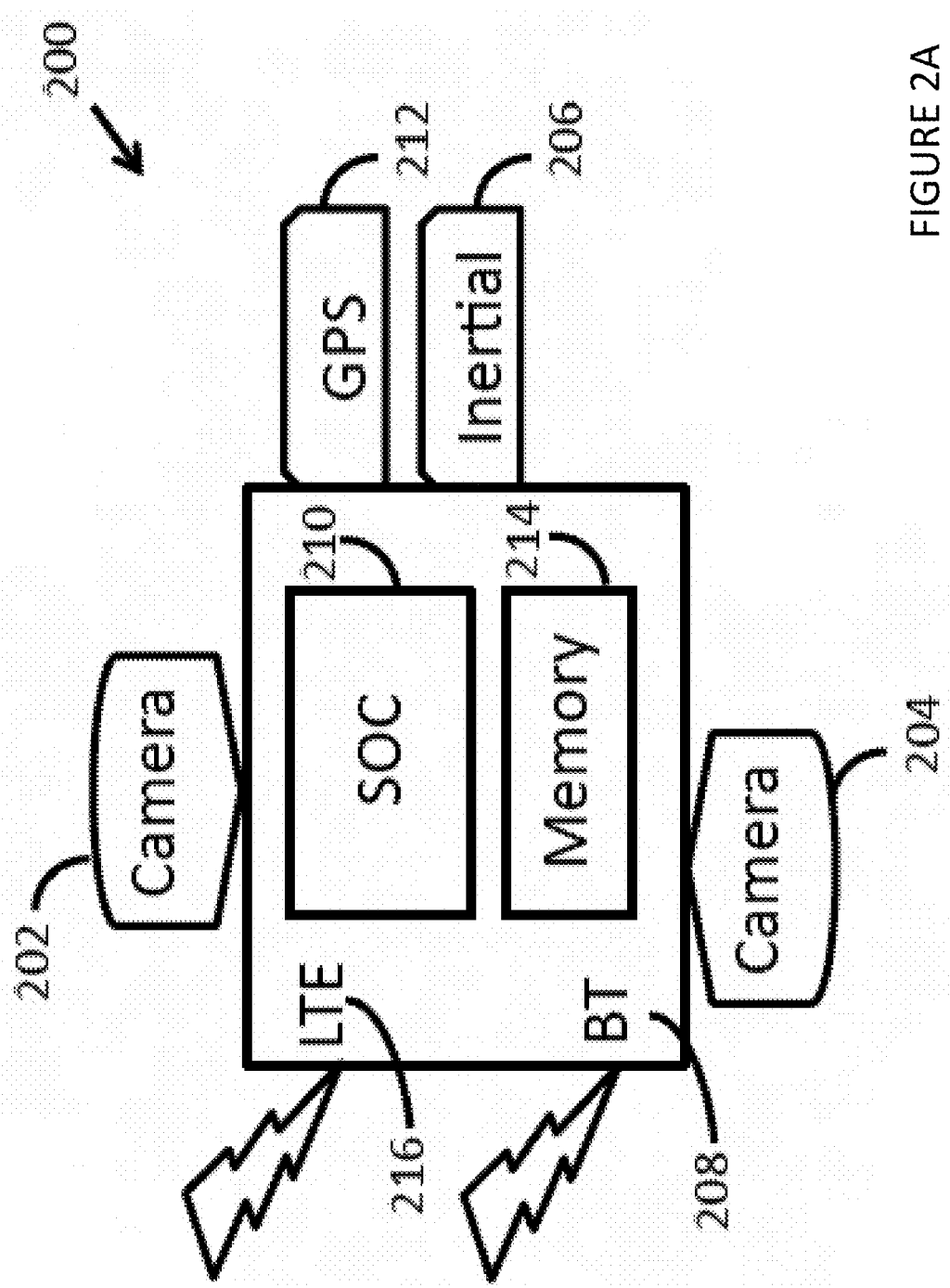
FIG. 2A illustrates an example of distributed video storage and search with edge computing in accordance with certain aspects of the present disclosure.

FIG. 2A illustrates an embodiment of a connected device in accordance with the aforementioned method of distributed video storage and search with edge computing. The device 200 may include input sensors (which may include a forward-facing camera 202, a driver facing camera 204, connections to other cameras that are not physically mounted to the device, inertial sensors 206, car OBD-II port sensor data (which may be obtained through a Bluetooth connection 208), and the like) and compute capability 210. The compute capability may be a CPU or an integrated System-on-a-chip (SOC), which may include a CPU and other specialized compute cores, such as a graphics processor (GPU), gesture recognition processor, and the like. In some embodiments, a connected device embodying certain aspects of the disclosed method for distributed video storage and search with edge computing may include wireless communication to cloud services, such as with Long Term Evolution (LTE) 216 or Bluetooth communication 108 to other devices nearby. For example, the cloud may provide analytics assistance. In an embodiment involving cloud services, the cloud may facilitate aggregation and processing of data for offline analytics and/or user queries. The device may also include a global positioning system (GPS) either as a separate module 212, or integrated within a System-on-a-chip 210. The device may further include memory storage 214.

Figure 2B:
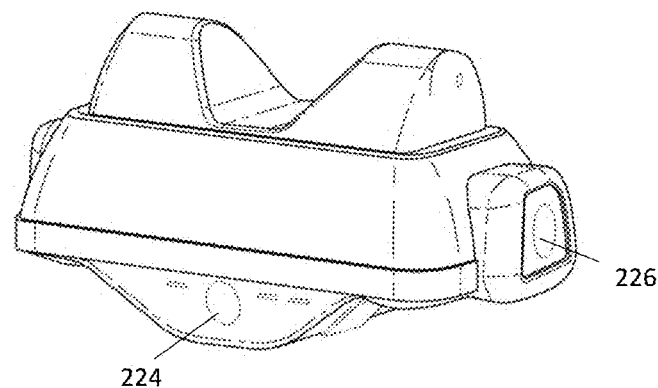
FIG. 2B illustrates an example of distributed video storage and search with edge computing in accordance with certain aspects of the present disclosure.
Figure 2C:
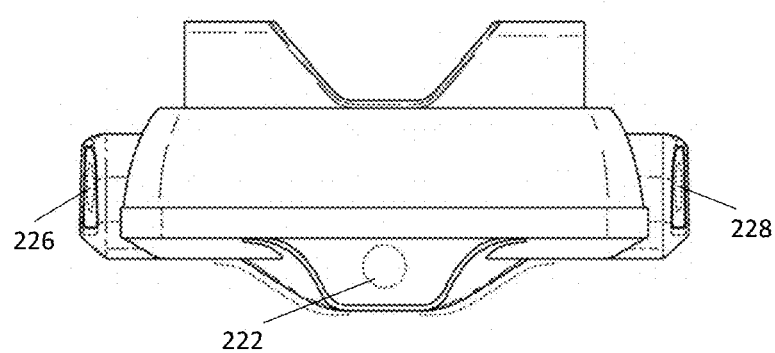
FIG. 2C illustrates an example of distributed video storage and search with edge computing in accordance with certain aspects of the present disclosure.

FIGS. 2B-C illustrate an embodiment of a device with four cameras in accordance with the certain aspects of the aforementioned devices, systems, and methods of distributed video storage and search with edge computing. FIG. 2B illustrates a front-perspective view. FIG. 2C illustrates a rear view. The device illustrated in FIGS. 2B-C may be affixed to a vehicle and may include a front-facing camera aperture 222 through which an image sensor may capture video data from the road ahead of a vehicle. The device may also include an inward-facing camera aperture 224 through which an image sensor may capture video data from the internal cab of a vehicle. The inward-facing camera may be used, for example, to monitor the operator of a vehicle. The device may also include a right camera aperture 226 through which an image sensor may capture video data from the right side of a vehicle operator's Point of View (POV). The device may also include a left camera aperture 228 through which an image sensor may capture video data from the left side of a vehicle operator's POV.

Variable Rate DNNs

In some situations, it may be desirable for a deep neural network (DNN) to process an input video stream within a desired latency. The desired latency may be configured as a max latency or an average throughput. As an example, in a real-time system, it may be desirable for a long-term average throughput of a DNN engine to be similar to an average input rate.

Processing visual data with a DNN may be computationally expensive. In some situations, a connected device may not have sufficient processing power to process all the input data while still satisfying specific latency or average throughput targets. In other cases, a DNN engine may be running on an Operating System that is not configured for real-time computation. For example, the DNN may be running on a smartphone using Android or iOS. In these cases, the amount of time available for processing may be variable depending on the other applications that are running on the device.

In other cases, the input data may be coming over an unreliable link, and the input stream may itself be presented to the DNN at a variable rate. In one embodiment of the present disclosure, the sensor and video may be captured on one device and transmitted wirelessly (over Wi-Fi) to another device where the DNN engine is running.

Certain aspects of the present disclosure provide methods for dealing with situations where the input rate is greater than the achievable throughput of the DNN engine on a device.

Random Packet Drop

According to certain aspects of the present disclosure, input data may be collected into packets. The packets may be put in an input queue. The size of the queue may be set based on the available storage. The DNN engine may process the packets one at a time. In one example, a packet of input data may correspond to a number of images that can be processed in a batch by an available GPU. If the queue is full, and a new packet arrives, one of the packets in the queue may be dropped. In one embodiment, the oldest packet in the queue is dropped. In an alternative embodiment, some packets may be marked high priority and may not be dropped. For instance, if there is another inference engine processing the metadata corresponding to the video stream, then the output of that inference engine may be used to mark the priority of the input video packets. In one embodiment of certain aspects of the present disclosure, there may be an inertial inference engine processing the inertial data (accelerometer, GPS, gyrometer, etc.). If the inertial engine detects an inertial 'alert', it may mark the corresponding video packet as a high priority packet. That video packet may not be deleted even if the queue is full. According to this method, it may be ensured that every packet (or substantially every packet) that is marked as important by the inertial engine may be processed by the video engine. When packets are dropped, the DNN engine may adjust its state machine correspondingly. In one embodiment, the DNN may reset its state machine on the start of every packet. In another embodiment, the state of the DNN may be adjusted by an amount that is a factor of the previous change in state. In one embodiment, a packet corresponds to one frame of video. In another embodiment, a packet corresponds to a batch of video frames and may include cropped and/or rescaled copies of individual video frames.

As described above, the packets may be dropped when the queue is full and a new video packet is received. In another embodiment, the packets may be dropped periodically. In another embodiment, the packets may be dropped pseudo-randomly.

Data Access

In a number of Internet of Things (IOT) applications, data may be created (e.g. captured) across distributed devices. A user may want to access some of this data at a point in time after it is created. However, bandwidth and backhaul limitations and/or costs may preclude gathering all of the data off of all of the distributed devices. While a user may want access to all of the data from all of the devices, bandwidth and backhaul limitations create challenges that may limit the availability of data.

Intelligent Driver Monitoring Systems (IDMS), for example, may include smart dash cams that monitor vehicle drivers for good and poor driving actions and may furthermore provide analytics and raw data to a cloud server. In such a use case, to overcome bandwidth and backhaul limitations, only videos and data determined to be of particular interest may be sent over a wireless data communication channel (such as a WAN or Wi-Fi connection). However, there may be much more video and data generated on the device. At a later time, there may be a call to report a driver's action or an event of interest regarding a period of time that was not initially determined to be of particular interest. As such, the associated video and other sensor data that was created at the time referred to in the report of the driver's action would not have been sent over the wireless data communication channel. This may have happened, for example, because an embedded analytics system did not generate an initial report based on the captured data, and so the video and data of interest may not have been uploaded automatically. Alternatively, there may have been an initial report generated, but the embedded device may have chosen not to send the data based on recent data usage history. Still, a fleet safety officer may want to request the video and data of interest associated with the report.

Another example is in a set of smart surveillance cameras. As the number of cameras increase, and as the pixel resolution of cameras increase, the demands of network backhaul and human surveillance may not scale to accommodate the amount of data generated. A smart surveillance camera may use computer vision and artificial intelligence to identify and upload video or other data associated with detected anomalies and items and/or events of interest. The surveillance camera may also cache additional video that is not automatically uploaded. Based on a reported event, a security officer may want to request cached video and/or associated data of interest.

Retrieval of Stored Data

Aspects of the present disclosure provide systems and methods to enable access to data of interest that is stored at or near the location where the data were generated. According to certain aspects of the present disclosure, at least some of the data may be cached temporarily on the data creation devices. Certain aspects of the present disclosure provide methods for a user to efficiently find and retrieve the video or data of interest, or confirm that the video or data does not exist.

As an additional consideration, as IOT devices are often designed for power efficiency, they may not be always on. That is, an IOT device may be powered down at a time that a user wants to access data that is stored on the device. Aspects of the present disclosure, therefore, provide systems and methods of data retrieval that are robust to the temporal presence or absence of devices.

In one embodiment, due to bandwidth constraints, power constraints, and the like, a device may intentionally stall upload. For example, the device may stall upload when connected via a cellular network. In this example, the device may resume the upload at a later time when connected to WiFi.

Multiple methods for determining that a device should stall uploads are contemplated. In one example, a device may attempt to upload data over a cellular connection (e.g. LTE), but the upload attempt may fail. The device may then retry the data transmission a short time later. In addition, after a determined number of unsuccessful attempts to transmit data, the device may intentionally stall further upload attempts over a cellular connection. In this case, a connection manager may receive WiFi hotspot information so that it may resume the upload when in proximity to a hotspot.

In another example, a connection manager on the device may broadcast registered components of signal strength. For example, the device may broadcast a Boolean signal wherein a '1' indicates a good signal strength and a '0' indicates a bad signal strength. Based on this input, an Uploader module may determine whether to stall upload. For example, based on a signal strength message, the Uploader module may determine that the device should stall further uploads until such time as either the cellular signal strength improves or until a WiFi hotspot is encountered. Likewise, based on the signal strength, the uploader may determine that only certain types of video data should be uploaded.

In one embodiment, data may be cached at the creation devices, or at devices near the creation devices that have less backhaul constraints than the cloud. A user may then query a server for data of interest. The server may then query the device for the data it contains. The server may then select a subset of the available data to download. In some embodiments, the data and/or a representation of the data may be presented to the user. If desired, the user may refine the search based on the downloaded data, and may repeat the process.

In another embodiment, the device may periodically, or a-periodically transmit to the cloud summaries of the data it has cached. This may enable user-server interactions to be faster and more efficient, particularly if a device is off-line when the user is making initial inquiries.

In another embodiment, aspects of the present disclosure may enable the cloud to process the compressed representation of the video and associated metadata using more information and/or more sophisticated algorithms. This may improve accuracy of the analytics and reduce bandwidth consumption by only retrieving uncompressed videos that are likely to be of interest. For example, the video may be cached on the device and some or all of the meta data (sensor data) and/or a compressed representation of the video may be transmitted to the cloud. The cloud may process the data. In some embodiments, the additional processing in the cloud may involve more computationally intensive algorithms that are embedded on the device. In some embodiments, additional information from other users and/or other servers may be incorporated into analysis on the cloud. Based on the processing in the cloud, the cloud server may determine that the video should be retrieved from the device. In this example, the percentage of videos of interest that are transmitted that are actually of relevance to the user may be increased.

Data Summary for Efficient Transmission

According to certain aspects of the present disclosure, a summary of available data on a device may be efficiently encoded based on the temporal nature of the data. In one embodiment, time may be slotted, such as in 1 minute slots, and the summary data may consist of a bit mask over a period of time with a 1 to indicate data is available for that slot and a 0 to indicate data is not available for that slot. The period of time may be encoded in the file or may be implicit based on the reporting times and intervals. In another embodiment, a summary of the available data may be efficiently encoded based on a series of time intervals specifying start and stop times of available data.

In another embodiment, the input video may be passed through a three-dimensional decimation filter, in which the first and second dimensions may correspond to the horizontal and vertical axes of a video and the third dimension may correspond to time. The subsampled video stream may be further processed by a DNN engine for object detection and localization. The parameters of the decimation filter may be adjusted based on a desired throughput.

Smart Queries

There may be a desire to reduce the amount of data sent during the time interval specified by a query. For example, a fleet safety officer may receive a call that one of their drivers was "driving erratically between 1:30 and 2 pm on 15 near Del Mar and almost rear ended a blue pickup truck". If the fleet safety officer requests the corresponding 30 minutes of high-definition (HD) video data, there may be a large cellular transmission cost associated with this request. In addition, if 30 minutes of HD video are transmitted, it may be cumbersome for the safety officer to look through the data to find the item of interest.

In one embodiment, a portion of the data that is of particular interest may be determined by sending a query to the device based on a combination of geographical constrains and temporal constraints. In this example, the fleet safety officer may draw a box around the appropriate section of 15 on a map resulting in a set of latitude and longitudinal constraints. Alternatively, or in addition, the safety officer may specify a time window of 1:30 to 2 pm. The query may be sent to the device on the truck identified in the report, or, if the identity of the truck is unknown or uncertain, may be sent to all of the devices on all of the trucks that may have met the specified constraints. Processing on the device may then process the locally cached data to determine if there are any data that meet the query constraints. A device may then send back that smaller set of data. In some embodiments, the device may send back a list of the data to allow the user to determine whether to further refine the search.

In another embodiment, analytics and higher-level information may be used to refine a search or a particular query. As in the previous example, a user may request data where the video contains a blue pickup truck. A set of refined analytics may have already provided metadata that includes, for example, the types of automobiles that were detected (cars, cargo vans, pickup trucks, etc) and their color. In some embodiments, this metadata may be used to further improve the query. In some embodiments, the metadata analysis may be used in conjunction with the geographical and/or temporal constraints. Alternatively, the metadata analysis may reduce the need for the user to provide geographical and/or temporal constraints. In addition, metadata analysis may enable the system to be more robust to human errors. For example, a reported traffic incident may have misreported the timing of the event, such that the actual event of interest occurred outside of the temporal window specified in the report.

In another embodiment, an analytics program or model may be transmitted as a part of the query. Referring to the example involving a blue pickup truck, the analytics program may be a convolutional neural network trained to detect blue pickup trucks. The neural network may have been trained in the cloud based on data from multiple embedded devices. The trained model may then be sent to the device, and the device may run it on all or a subset of its clips to look for positives.

In this example, a connected device may have already inferred pertinent analytics values and stored these values. For example, the device may routinely characterize locally stored clips for potential anomaly or event upload. Since the clip may not have been uploaded already, the initial constraints configured on the device may not have been met. In this case, a set of summary data associated with video data, such as average following distance data or a count of a number of people seen, may help the user select the data to request. In addition, a targeted analytics program of existing analytics values may be sent to a device to prioritize the data. Optionally, a feature vector representation of the data may be sent to the cloud to enable additional analysis or selection. Optionally, the frequency of detected targets, and/or confidence of detection may be sent from the device to the cloud.

According to certain aspects, indications of associated video clips may also be sent. In one embodiment, this may be an indication that a video clip that was previously sent due to a detected event at the time. The device may then determine that, for example, a blue pickup truck in a second clip has a very close feature vector and is likely the same blue pickup truck in a previously sent video clip. This may allow the user to view the existing clip to determine if it is the object of interest and whether transmission of the video clip would be worth the backhaul costs. In addition, data may be compressed and sent with successive refinements for more efficient search. In one embodiment, the video may be compressed to 1 bit line art by using a Canny edge detector followed by an H.264 or H.265 or other video encoder set to a low bit rate. Once the user finds the event of interest the user may then request the full or a higher resolution encoding of the video According to certain aspects, queries could be used to find desired training data. For example, a feature vector query or neural network query could be sent based on snow scenes to help find snowy training data across the devices.

Data Management on a Connected Device with Storage

Certain aspects of the present disclosure provide methods of managing device storage. For example, certain aspects provide methods for managing device memory storage in the case that an edge device having memory is a smartphone. In addition, certain aspects provide a storage configurations, retrieval systems and methods, and an Application Program Interface (API).

In one embodiment, the data may be managed in a single first-in-first-out (FIFO) queue with a given storage limit. In this example, the most recent data may push out the oldest data. In another embodiment, the data may be pushed out based on a combination of the age of the data and the analytics information of the data. For example, in the IDMS use case periods of time with higher acceleration forces, closer following distances, or more extreme lane positions may have a higher score and thus be kept longer compared with more typical or less interesting data.

In one embodiment, a linear or non-linear equation over the different analytic components and age of the clip may be used to compute a probability or score for each clip. The scores may be normalized to 1 to form a probability density, and then a random variable with those probabilities may be used to determine which clip or data to drop when adding a new clip or data.

In a second embodiment, there may be multiple queues for different items, such as a queue for events with stops greater than 0.3 Gs and a queue for following distances closer than 2 seconds. The queues may be prioritized and each queue may be a FIFO queue with different queue lengths. The data may then be put into the appropriate queue based on the highest priority for which it meets the constraints of that queue. This may enable keeping around more interesting events for longer periods of time.

As a refinement on a FIFO queue, there may be a series of queues such that the data is dropped from the first queue, and then, instead of being deleted it may be compressed so that it takes up less storage space. The compressed video may then be put into a second queue. There may be multiple levels of compression. For example, videos that are one-day old may be stored in a second queue at a second compression level and videos that are three days old may be stored in a third queue at a second compression level. In one embodiment, the compression may comprise dropping the average target data rate for the video compressor. The compression may also reduce one or more of the frame rate, resolution, or color depth. The compression may also change the data format, such as making line art such as with a Canny edge detector, compressing to bounding boxes using object recognition, an analytics feature vector or other filters or transformations.

For a connected device with storage, it may be desirable to store video data and corresponding metadata files. An example of a connected device may be a smartphone, such as a Nexus smartphone. In one embodiment, the connected smartphone may be configured with an internal memory of 32 GB. A system may be configured to allocate 15 GB of this internal memory for local device storage. In one embodiment, an exemplary pair of data files (which may include a one-minute video file and an associated metadata file) may occupy 30 MB of storage. Therefore, the 15 GB allocation of memory may provide enough room for 500 such data file pairs. The allocation of memory may contain a circular buffer containing the names of each of the stored files.

In one embodiment, some of the device memory may be allocated to particular events of interest. For example, it may be desirable to retain the video and metadata file data associated with the first three minutes of a recording session. In addition, it may be desirable to retain the video and metadata file data associated with the last three minutes of a recording session. In an embodiment in which the recording session corresponds to a driving trip, the first three minutes of the trip may be referred to as an "Ignition On" state. Likewise, the last three minutes may be referred to as an "Ignition Off" state. In this example, there may be an allocation for 3 "Ignition On" state pairs and 3 "Ignition Off" state pairs. The remainder of the data allocation may then be a circular buffer that may hold a maximum of 494 one-minute data pairs. The data pairs allocated to these remaining 494 data pair locations may be referred to as "General Video".

In one example, the file names in a pair may be substantially identical. For example, the filenames may include a GPS location or timestamp associated with the recorded data. The filenames of each pair may differ by an extension only (.mp4 and .txt, for example).

In one configuration, a smartphone may be configured to maintain three circular buffers of different sizes. In some embodiments, the sizes of each buffer may be configurable by a user. Each buffer may be associated with a different type of 'event'. In one example, 'event' types may be 'General Video', 'Ignition Off', 'Ignition On'. In the case that analytics is performed on the phone, or on a nearby device, more 'event' types may be specified.

Continuing with the smartphone example, a circular buffer may contain the filenames of up to 494 General Video pairs. The 'General Video' circular buffer may store every video clip and corresponding metadata file, up to the memory limit. The 'Ignition Off' circular buffer may store the first (three) minutes of video & metadata files after the ignition has turned off. The 'Ignition On' circular buffer may store the first (three) minutes of video & metadata files after the ignition has been turned on. The particular number of minutes allocated to each buffer may be configurable by a user.

It may be desirable to retrieve a specified file from the device. To facilitate such requests, an Application Program Interface (API) for video pair data retrieval may include a Register API, a VideoList API, and a VideoUpload API. As part of the VideoList API, the connected device, which may be a smartphone, may transmit a list of all the files it is storing in the different circular buffers. All the files may be uniquely identified by the GPS Location and time, and so a system may be used to list out the files by location and/or time based on the identifiers. The cloud may maintain a list of files as a searchable database. The user may be provided a User Interface (UI) to search the list. If there is a match or near match, the cloud may send the phone the name of the file to retrieve. The phone may transmit the corresponding file using the VideoUpload API. If there is no match, the user may be shown a suitable message in the UI indicating the unavailability of the requested video and or video data pair.

A Register API may be called from a connected device, such as a smartphone. In some embodiments, the Register API may be called only once from a particular device. The Register API may be used for registering with a server. In one example, a connected device may register with a Google Firebase Messaging (FCM) server. In some embodiments, the Register API may be called more than once. For example, it may be called again if the security of an exchanged token exchanged is compromised, the app is re-installed, and the like.

An exemplary Register API may have the following structure:

```
{
    "session_id": <unique session id>,
    "device_id": <unique device id>,
    "ver": <API version>,
    "imei": <unique IMEI number of the phone>,
    "fcm_id": <unique id of the client generated by FCM server>
}
```

A VideoList API may be called at predetermined intervals. In one example, the VideoList API may be called at regular intervals. In a second example, the VideoList API may be called after the connected device records a predetermined number of data pairs. In one embodiment, a connected device may upload two lists of video files, one for each data pair that is currently held by three circular buffers. Continuing with the same example, the circular buffers may correspond to ON, GENERAL, and OFF states. The first list may indicate the files which have been added since the last VideoList API call and the second list may indicate the files which, owing to the circular buffer, have been deleted since the last VideoList API call.

An exemplary VideoList API may have the following structure:

```
{
    "session id": <unique session id>,
    "device id": <unique device id>,
    "ver": <API version>,
    "added": [{
        "filename": <unique file name of video file>,
        "duration": <duration of the video>,
        "priority": <category:ON, OFF or GENERAL>
    },
    ...
    ...
    {
        "filename": <unique file name of video file>,
        "duration": <duration of the video>,
        "priority": <category:ON, OFF or GENERAL>
    }],
    "deleted": [{
        "filename": <unique file name of video file>,
        "duration": <duration of the video>,
        "priority": <category:ON, OFF or GENERAL>
    },
    ...
    ...
    {
        "filename": <unique file name of video file>,
        "duration": <duration of the video>,
        "priority": <category:ON, OFF or GENERAL>
    }]
}
```

A VideoUpload API may be called in response to an FCM PUSH notification received from a cloud server. The VideoUpload API may be used to pull any type of file from the edge device. For example, when a collision event occurs, a VideoUpload message may request both the metadata data as well as the corresponding video (.mp4) data. In this example, the two data types may share the same filename and differ in their file extension. In other cases, a VideoUpload message may request that only the metadata file that is associated with Video data be uploaded. In some embodiments, a VideoUpload message may request that metadata and observation data be uploaded for most event types, and that video data be uploaded as well for certain events, such as collisions.

An exemplary FCM PUSH notification may have the following structure:

```
{
    "request id" : <unique id>,
    "videoList" : <list of filenames>,
}
```

In the above example. an FCM PUSH request contains a list of multiple video filenames. In one example, an FCM PUSH notification may include a videoList having four filenames. In another example, and FCM PUSH notification may include a list including only one filename.

The received notification may contain the filename of the video or video data pair for which there is a desire to retrieve a corresponding data from the device. If the desired video is present on the device, then the concerned video may be uploaded using this API and the status field may be set to "Available". Otherwise, the status field may be set to "Unavailable" and no file may be uploaded.

An exemplary VideoUpload API may have the following structure

```
file: <Video file name>
data: {
    "session_id": <unique session id>,
    "device_id": <unique device id>,
    "ver": <API version>,
    "status": <Video Available or Unavailable>
}
```

Upon receiving a message via the VideoUpload API a connected edge device may upload the requested file or files. If the file cannot be uploaded, then the requested file may be stored in a portion of memory associated with a higher level of data persistence so that it may be uploaded at a later time.

Data Transmission Following a Collision

Whenever an IDMS detects a collision, there may be an added urgency to communicate information from the IDMS to an interested party. Multiple ways of sending a notification of a collision are contemplated.

In a first embodiment of data transmission following a collision, a processor running on the client device may infer that a high-g event has occurred, for example, by observing an accelerometer reading that corresponds to a collision. The device may then send a packet of data to a cloud server containing the following: a file containing a description of the alert (e.g. a json file); a name of the most recent video file recorded by the IDMS prior to the detected collision event; the name of the video data files corresponding to the detected event; and the contents of the current metadata file recorded up until the time of the collision. According to this embodiment, a small message may be sent from the device at a very low latency (e.g. <50 msec) from the time that a putative collision is detected. This may be desirable in a situation in which a true collision is detected. For some collisions, for example, the impact of the collision may damage or destroy the connected device, thereby cutting off subsequent data transmissions. Upon receiving the packet of data from the device, the cloud device may send a FCM PUSH notification requesting upload for the listed files: last video, last metadata, and current video. These video files may be useful to understand the circumstances of the event. Note that a metadata file associated with a video file may have the same name and may differ by a file extension.

In a second embodiment of data transmission following a collision, there may not be a distinction between a high-g (possible collision) alert and other types of alerts (e.g. alerts that are detected based on processing of visual data that do not have an inertial signature). In this embodiment, after an alert is reported by the analytics (inference) engine, an uploader module will be informed with the file name/path of alert file as an Inter-Process Communication (IPC) message. The Uploader may then upload or backup the file depending on whether there is an available network connection.

In this second embodiment, if the edge device is connected to the internet, a detected alert may cause the client device to upload metadata and/or observation data associated with the alert. Thereafter, a cloud device may run second pass analytics on the uploaded file or files. The second pass analytics may determine if the alert is likely be a valid event or a false alarm. If it is determined to be a valid event, the cloud server may update an AWS shadow. In one configuration, an AWS IoT client configured to run on the client device may poll the AWS shadow for status updates. Once the client receives the alert upload request from the shadow it will send a VoD upload message to the Uploader. In this way, a system may conserve bandwidth by declining to upload video data that are likely to be false alarms. In addition, by using a shadow, the system may be robust to connectivity outages.

Note that the second embodiment may operate in a streaming mode such that a putative collision alert may be communicated to the uploaded at a low latency. The uploader may, in turn, upload the alert data at a low latency if it is determined to come from a particular class of alerts. Other data received at the uploader may limit the transmission of such messages, however. For example, the observation data may indicate that the putative collision is actually a false alarm. In this case, the uploader may decline to transmit the putative collision data at a low latency Notification Frameworks An embodiment of certain aspects of the present disclosure may include use of Google's Firebase Cloud Messaging (FCM) service to send notification to the mobile (android) app. The use of other notification frameworks (such as Apple's push notification) are also contemplated. Upon request of a certain video(s), a cloud server (for an IDMS application, for example) may send a notification to a mobile app via FCM which may trigger the app to send one or more requested Videos to the IDMS server (cloud). This approach may ensure that even if the mobile is temporarily out of network coverage, the request is not lost. In one configuration, the requests may be held in FCM for up to 4 weeks in case the device is unreachable.

In another embodiment, upon a request for new Videos, a list of requested Videos that were stored in a cloud database may be provided. The cloud server may wait for a device to poll (e.g. a keep-alive request). As a response to the poll (keep-alive request), the cloud server may send an instruction to the device to upload the list of videos.

Additionally, certain aspects of the present disclosure provide methods by which the cloud sends only one video request at a time. Once one video has been received, an enabled system may automatically send a request for the next video in the list if there are n (>1) number of videos requested in one RequestId. These methods may lessen housekeeping overhead on the device, and may also provide means for the user to get some videos quickly. This may perform better compared to an embodiment that requests all Videos together. In this latter case, the device may send all videos together over a potentially slow/unreliable network—resulting in either none or all videos being received by cloud. The former case may be more desirable since safety officer may gain access to at least some videos to view while waiting for other videos to arrive.

In some embodiments, there may not be a send request to the device if the videos have been already received either as part of a prior request or as part of alert video, as described above.

Intelligent Pre-Selection

Machine learning based systems requires data for learning. The cost of transmitting and storing the data that is desired for a machine learning system may be prohibitive. For instance, in an IDMS (Intelligent Driving Monitoring System), a device recording video at 1080p resolution may be generating upwards of 30 MB of data per minute. Transmitting all of this data over a wireless link may be too expensive and may not even be feasible at certain locations. Moreover, once transmitted, storing all of this data at the cloud may be too expensive.

In some situations, the data at different times may have different amount of relevance for training. For instance, if the system needs to train for driving during rain then transmitting the data during sunny days may be less useful. In another example, the system may be configured to train on traffic lights. In this case, videos with no traffic lights may be less useful than videos that have traffic lights. According to certain aspects of the present disclosure, the device may use 'filters' to decide which data should be transmitted to the cloud. These filters may have both a high precision and recall. In some embodiments, precision and recall may be subject to a user-defined trade-off.

For instance, a filter with high precision but poor recall may conserve bandwidth, but may also miss some important events. A filter with low precision and high recall may be less bandwidth efficient but may capture more of the desired events. Continuing with the example of traffic lights, the device may run a DNN engine that may have low precision and high recall for detecting traffic light. Even with a low precision, this network may enable a system to be more bandwidth efficient than one that transmits all the video to the cloud. In this example, an artificial neural network trained with raw video feed may have poor precision for traffic light detection since traffic lights may be infrequent in typical driving scenarios. By transmitting and then labeling videos likely to contain traffic lights, the DNN's performance detecting rare objects such as traffic lights (which may be rarely encountered by interstate truckers, for example) may be improved.

Distributed Video Search

Certain aspects of the present disclosure are directed to searching visual data, such as video streams and images, captured at one or more devices. The number of devices may be denoted as N. The value of N may range from one (a single device) to billions. Each device may be capturing one or more video streams, may have captured one or more video streams, and/or may capture one or more video streams in the future. It may be desired to search the video streams in a number of these devices. In one example, a user may desire to search all of the captured video streams in all of the N devices. In another example, a user may desire to search a portion of the video captured in a portion of the N devices. A user may desire, for example, to search a representative sample of devices in an identified geographical area. Alternatively, or in addition, the user may desire to search the video captured around an identified time.

A search query may include an indication of specific objects, objects having certain attributes, and/or a sequence of events. Several systems, devices, and methods of detecting objects and events (including systems and methods of detecting safe and unsafe driving behaviors as may be relevant to an IDMS system) are contemplated, as described in PCT application PCT/US17/13062, entitled "DRIVER BEHAVIOR MONITORING", filed 11 Jan. 2017, which is incorporated herein by reference in its entirety.

Current approaches to searching video collected at N devices include transmitting the captured video data from the N connected devices to a cloud server. Current systems may then process the transmitted videos with computational resources available in the cloud. For large values of N, the bandwidth and computational costs of this approach may make some use cases impractical.

Certain aspects of the present disclosure are directed to systems and methods that may improve the efficiency of distributed video search. Efficiency may be measured by a bandwidth cost and/or a compute cost for the search query. In some embodiments, a first compute cost may be measured for computations performed in a cloud computer network and a second compute cost may be measured for computations performed at connected edge devices. It may be desirable, for example, to reduce the computational burden of a cloud computer network provided that the computational burden that is thereby shifted to each edge device is below a predetermined threshold. Accordingly, a measurement of a compute cost at a connected edge device may be an indication that the compute cost is less than or greater than a pre-determined compute budget. In addition, efficiency measurements may include a latency. Efficiency measurements may also include a memory storage utilization, for example, in a data center. Alternatively, or in addition, memory storage utilization may be measured for connected edge devices.

Regarding latency, in one example, a user may desire to perform a video search so that the results are reported within a specified period of time. The time between an initiation of a video search query and a return of a satisfactory result may be referred to as a latency of a video search query. Efficiency of a distributed video search system may correspond to a desired latency. For example, for a relatively low desired latency, the efficiency of a distributed video search may be less, since the relatively faster reporting time of the results may depend on relatively more bandwidth utilization and/or relatively more compute resource utilization.

Examples of distributed video search may include an intelligent driver monitoring system (IDMS), where each vehicle has an IDMS device and the user/system may search and retrieve 'interesting' videos for training/coaching purposes. An example of 'interesting' videos in this context may be videos in which there is visible snow, videos in which there are visible pedestrians, videos in which there are visible traffic lights, or videos corresponding to certain patterns of data on non-visual sensors. Examples of patterns of data in non-visual sensors may include inertial sensor data corresponding to a specified acceleration or braking pattern. Other examples of non-visual sensory may include system monitoring modules. A system monitoring module may measure GPU utilization, CPU utilization, memory utilization, temperature, and the like. In some embodiments, a video search may be based solely on data from non-visual sensors, which may be associated with video data. Alternatively, or in addition, a video search may be based on raw, filtered, or processed visual data.

Another example of distributed video search may include an IDMS in which a cloud server issues a search query to retrieve all or a portion of videos corresponding to times when a driver has made a safe or unsafe maneuver.

Another example of distributed video search may include an IDMS in which a user issues a search query to retrieve videos that contain one or more specified types of vehicles, or vehicles having one or more specified features. For example, a search query may specify a particular license plate. In another example, a search query may specify a set of license plates consistent with a partial specification of a license plate. An example of a partial specification of a license plate may be a search query for all license plates starting with the letters "6XP". Alternatively, or in addition, a search query may specify a feature of a vehicle, such as a color, model, make, and or class of vehicle.

Another example of distributed video search may include a video surveillance system with multiple cameras mounted at different locations. In this example, it may be desirable to search for a specific person. In another example, it may be desirable to search for a specific sequence of actions such as loitering.

Current approaches to distributed video search may depend on collecting video data from a number of video cameras or surveillance devices. For example, in the aftermath of a terrorist attack, authorities may first collect video data from surveillance cameras that are mounted in the vicinity of the attack. In addition, authorities may collect video data recorded by handheld devices, such as smartphones, that may have been uploaded to a social media platform. Authorities may then search the collected video data to find images corresponding to an identified person of interest.

Popular search engines such as Google and Yahoo may allow a user to enter a text query to search for video clips. Based on the text query, the search engine may report a set of video clips that may be relevant to the text query. Similar functionality is available on You Tube and other video hosting sites. To enable text based search, these search engines may tag video sequences with text attributes. In some cases, the tagging may be done manually and/or in an automated fashion. When a user enters a text query, the user's text may be compared to the tag annotations to identify a set of videos that may be relevant to the text query. This approach may be referred to as content-based video search. The accuracy of the content based search may be limited by the extent to which the text annotations describe the content of the corresponding videos, as well as the algorithm or algorithms used to determine the similarity between a text query and the text annotations.

While video hosting sites and search engines offer services by which a user may quickly search a large corpus of video data, these search services may require significant computing and memory storage resources. For example, You Tube may allow its users to search over its large corpus of video data which may be stored in one or more data centers. Furthermore, the data centers that receive the video data may expend significant compute resources to automatically annotate each uploaded video, to classify the uploaded videos, and the like. In addition, the collective bandwidth utilization associated with the many independent uploads of video content by content providers may be large. The combined costs of computing, memory, and bandwidth resources that are associated with current large-scale video search systems may be prohibitive to all but the largest internet corporations.

Accordingly, aspects of the present disclosure are directed to scalable systems, devices, and methods for searching through video content. The video content may be user generated across hundreds of thousands of devices, or even billions of users, for example, if the search query is sent to all users of a popular smartphone app.

Distributed Video Search with Edge Computing

Figure 3:
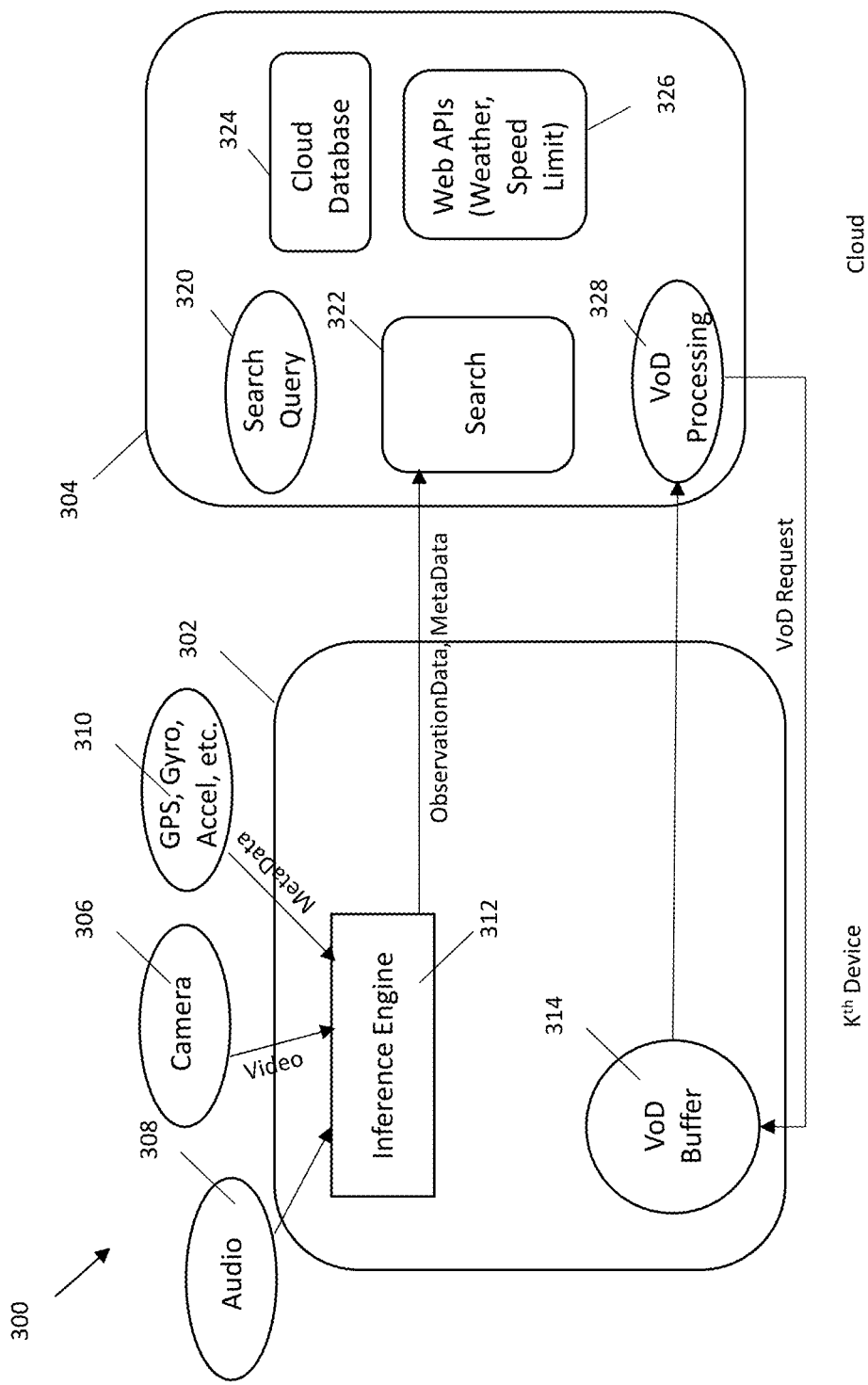
FIG. 3 illustrates an example of distributed video storage and search with edge computing in accordance with certain aspects of the present disclosure.

FIG. 3 illustrates an embodiment of a system 300 in accordance with the aforementioned devices, systems, and methods of distributed video search with edge computing. In FIG. 3, one device 302 is illustrated. The system 300 may contain N devices, in which N may range from one to billions. The device 302 may be referred to as the 'Kth' device. In this exemplary system, each device of the N devices may receive video from a corresponding camera or multiple cameras, and/or multiple audio streams, and/or additional metadata. In this example, device 302 receives video data from a proximate camera 306 and audio data from an audio sensor system 308. The device 302 also receives additional metadata. The source 310 of the additional metadata may include GPS, accelerometer data, gyrometer data, and the like. The metadata may also include system data such as GPU usage, CPU usage, DSP usage, memory utilization, and the like.

The device 302 may include an inference engine 312, which may be a GPU, CPU, DSP, and the like, or some combination of computing resources available on the device 302, configured to perform an inference based on received data. The inference engine 312 may parse the received data. In one example, the inference engine may be configured to process the received data with a machine learning model that was trained using deep learning. The output of the model may be a text representation or may be transformed into a text representation. A text representation of video data may include a set of textual identifiers that indicates the presence of a visual object in the video data, the location of a visual object in the video data, and the like.

In another example, the inference engine may be configured to process the received data to associate the metadata with video data recorded at or around the same time interval. In another example, the inference engine may be configured to process the metadata with a machine learning model. The inference engine may then associate the output of the machine learning model with the corresponding video data recorded at or around the same time interval.

In some embodiments, the text representation, or another representation of the inference data, may be transmitted to the cloud 304. The cloud 304 may include to one or more computers that may accept data transmissions from the device 302. The text representation of the video and/or other inference data may be referred to as 'observation data'. In addition, in some embodiments, the metadata corresponding to certain non-visual data sources 310, may be transmitted to the cloud. Similarly, in some embodiments, the metadata corresponding to certain non-visual data sources 310 may be processed at the inference engine 312 to produce metadata inference data, and the metadata inference data may be transmitted to the cloud.

In one embodiment, the video captured by the camera 306 may not be transmitted to the cloud 304 by default. Instead, the video data may be stored in a memory 314 on the device 302. The portion of the memory 414 may be referred to as a 'VoD' buffer. 'VoD' may indicate 'video-on-demand' to reflect that the video may transmitted to the cloud (or to another device) on an 'on-demand' basis.

The cloud system 304 may receive a search query 320. After the cloud receives data from the inference engine of at least one of the N devices, such as the inference engine 312 of the Kth device 302, it may process the search query at a computing device 322 configured to perform a search. The search results may be based on a match or a degree of similarity between the search query 320 and the received data, where the received data may include metadata and or observation data (which may inference data based on camera, audio, and/or metadata). In some embodiments, the metadata may include non-visual sensor data, such as GPS and/or inertial sensor data. In addition, the search may be based on data from a stored database 324. Alternatively, or in addition, the search may be further based on data received from internet sources 326. Internet sources may include web applications interfaces (APIs) that may provide, for example, weather data and or speed limit data. In one example, the compute device 322 configured to perform the search may query a weather API 326 with a GPS location 310 transmitted by the Kth device 302 as metadata. The API may return weather information based on the GPS location and time of the received data, and/or a time stamp indicating when the received data was captured.

Based on the determined match or determined degree of similarity, the cloud system 304 may determine a relevance of a given video data. Based on the relevance, the cloud may then identify a set of video sequences to fetch from the N devices. For example, the search may determine that a video from the Kth device 302 should be fetched. Data corresponding to the desired video may be transmitted to a VoD processing engine 328. The VoD processing engine may transmit the VoD request to the Kth device 302. Within the Kth device 302, the VoD buffer 314 may receive the VoD request. The requested video may then be transmitted to the cloud 304 or directly to another device.

In some embodiments, videos stored in the VoD buffer 314 on an edge device, such as the Kth device 302, may be indexed. The index of each video may be transmitted as part of the metadata to the cloud system. In this example, the VoD processing engine 328 of the cloud system 304 may transmit a VoD request that includes the index associated with the requested video on the Kth device. By keeping track of the index at the Kth device and in the cloud, the latency and compute resources associated with a future VoD request may be reduced.

Compared with video search systems that rely on uploading each searchable video to the cloud, a video system such as the one illustrated in FIG. 3 may use less bandwidth. Each of the N devices may send only a reduced representation of video data to the cloud, and the video data may still be searchable in the cloud. That is, each of the N devices may send observation data and/or metadata corresponding to each searchable video to the cloud. As video data may be larger than the corresponding observation and/or metadata, a distributed video search system such as the one illustrated in FIG. 3 may be said to be bandwidth efficient. In addition, the search system 322 may be considered compute efficient since the computationally complex machine vision task of parsing the input video sequence is done at each device rather than at a central server. In addition, the video search system 300 may be considered scalable since the available compute power increases with the number of available devices.

A distributed video search system that relies on uploading each searchable video to a data center may be overwhelmed if the number of devices contributing video data suddenly increases. Similarly, the compute resources of the data center of such a system may be provisioned beyond the current needs of the system. In comparison, a distributed video search system in accordance with certain aspects of the present disclosure may scale to large numbers of contributing devices more gradually. In addition, the total computing power available on cloud devices and the N contributing devices may increase and decrease with N, so that the resources provisioned may more closely fluctuate according to the demands of the system.

Distributed Video Search with Edge Search

Figure 4:
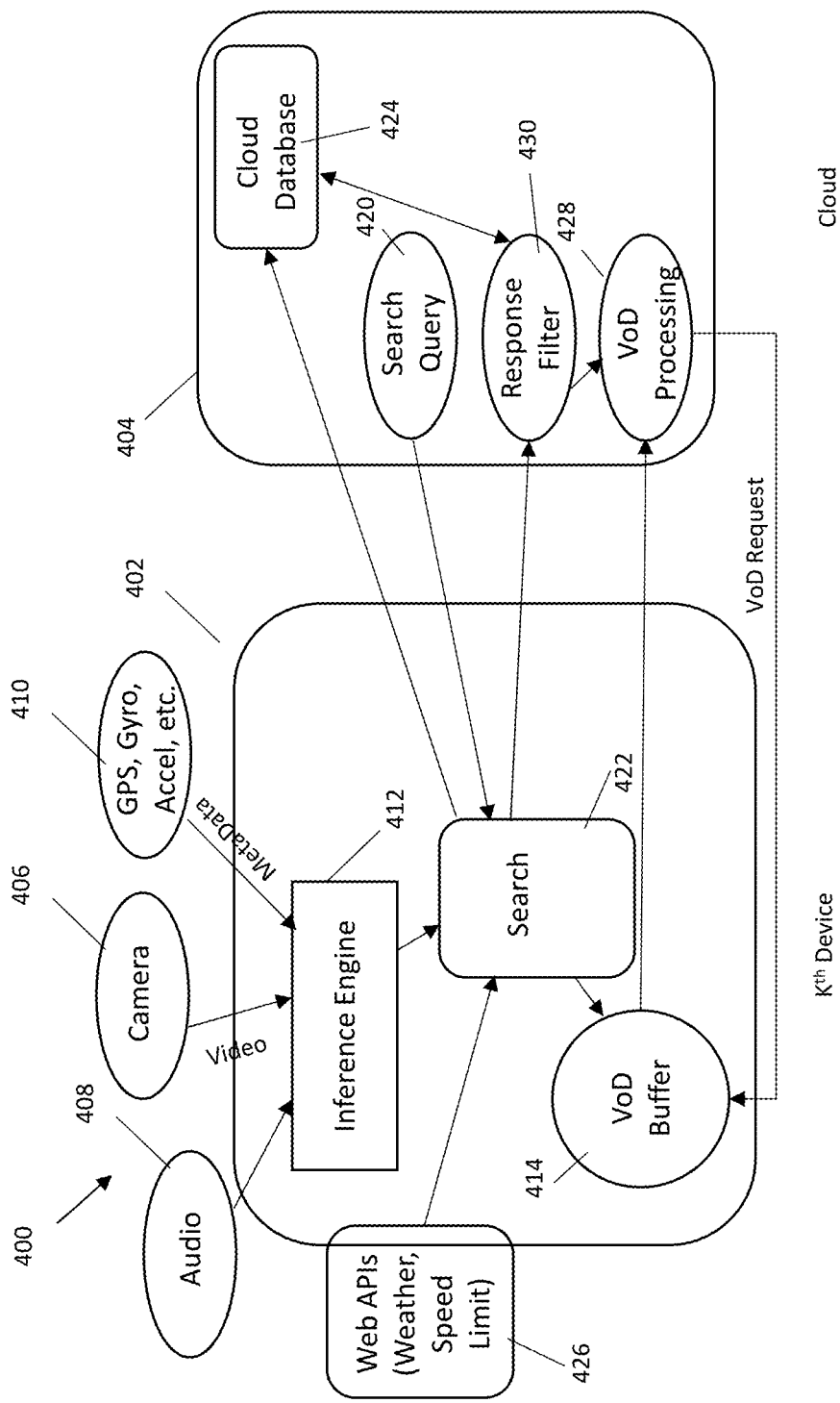
FIG. 4 illustrates an example of distributed video storage and search with edge computing in accordance with certain aspects of the present disclosure.

An alternative approach to distributed video search is illustrated in FIG. 4. In this embodiment, the cloud system 404 does not perform the search 422. Rather, the cloud 420 sends a search query 420 to some of the connected devices and the search is performed in the connected devices. The search may be considered an "edge search" since the search occurs at the outermost edge of the networked system.

The system 400 may contain N devices, in which N may range from 1 to billions. The device 402 may be referred to as the 'Kth' device. FIG. 4 illustrates an example in which a search query 420 is sent to the Kth device 402.

In this example, device 402 receives video data from a camera 406 and audio data from an audio sensor system 408. The device 402 also receives additional metadata. The source 410 of the additional metadata may include GPS, accelerometer data, gyrometer data, system data, and the like. The device 402 includes an inference engine 412, which may be a GPU, CPU, DSP, and the like, or some combination of computing resources available on the device 402, configured to perform an inference based on received data. The inference engine 412 may parse the received data.

In this embodiment, the inference engine 412 of the Kth device 402 may output observation data, which may be referred to as inference data, and/or associated metadata to a proximate computing device 422 configured to perform a search. The proximate computing device 422 may be located within or near the device 402.

The proximate computing device may produce search results based on a match or a degree of similarity between the search query 420 and the received data. Alternatively, or in addition, the search may be further based on data received from internet sources 426. Internet sources may include web applications interfaces (APIs) that may provide, for example, weather data and or speed limit data. In one example, the compute device 422 configured to perform the search may query a weather API 426 with a GPS location 410 received by the Kth device 402.

In some embodiments, the video captured by the camera 406 may not be transmitted to the cloud 404 by default. Instead, the video data may be stored in a memory 414 on the device 402.

In some embodiments, the results of the search may be transmitted to the cloud where they may be stored in cloud database 424. The cloud system 404 may be further configured to have a response filter 430. The response filter 430 may keep track of the results returned from the different N devices in the system 400. Based on the number of responses received and the degree of relevance indicated by a search result, a VoD Processing unit 428 may generate a request for transmission of a corresponding video file. The VoD request may be sent to the device 402 that has the video in memory, such as the VoD buffer 414 in the Kth device 402.

In another embodiment, the first device may initiate a transmission of video data based on the determined relevance of the video data. In this example, the proximate compute device may or may not generate a search result for transmission to the cloud.

Compared to the configuration illustrated in FIG. 3, embodiments in accordance with the configuration illustrated in FIG. 4 may have greater bandwidth efficiency because the observation data need not be sent to the cloud for every searchable video. Likewise, this configuration may be compute efficient compared with the configuration illustrated in FIG. 3 because the search may be done at the connected devices, such as the Kth device 402.

Still, compared with the configuration illustrated in FIG. 3, the configuration illustrated in FIG. 4 may have a larger latency since the search query is first communicated to remote devices. In addition, performance of certain types of searches may be more cumbersome. In one example, a user may search for all cars that were within the Field of View of a camera on a first remote device and a second remote device. To accomplish this search, the results may be transmitted to the cloud device and then compared at the cloud device. Alternatively, results may be sent from the first device to the second device, or vice versa. In contrast, with the configuration illustrated in FIG. 3, the results from the first device and the second device would already be available at the cloud at the time that the video search was initiated.

In addition, since the search may be performed at each device, each device may need to make a separate call to an internet API, such as a weather API. In some cases, the remote device may have a poor internet connection, and the search results may be delayed and/or degraded. In contrast, with the configuration illustrated in FIG. 3, calls to an internet API from the cloud may be grouped together and may be completed more quickly and reliably.

Additional variations are also contemplated. In one embodiment, a search query that is sent to remote devices may include a model, such as a computer vision model, that may be used on the remote devices to reprocess stored video data and/or video stream data from the camera sensor, as described in exemplary embodiments below.

Device is Proximate to Camera

In one embodiment, the number of devices receiving a search query may be limited to a subset of the available devices. For example, the cloud may transmit the search query to devices that are in a particular geographic location. In some embodiments of the present disclosure, the location of a device where video data is stored may be correlated with the location where the video data was captured. In one example, a search query may be broadcast from a number of cell phone towers corresponding to the desired location of the search. In this example, the search query may be restricted to the devices that are within range of the utilized cell phone towers. In another example, the cloud server may keep track of the location of each connected device. Upon receiving a search query, the cloud server may limit the transmission of the search queries to devices that are in a given geographical region. Likewise, the cloud server may restrict the transmission of the search query to devices that were in a given geographical region for at least part of a time period of interest.

To facilitate a geographically limited search, a device (such as the device 302 illustrated in FIG. 3 or the device 402 illustrated in FIG. 4) may be proximate to the camera (306 or 406, respectively) that captured the video stored at the device. The device and the camera may be connected by a fixed wired connection, by a wireless connection, and the like. The camera may be either mobile or stationary, and likewise the device may be mobile or stationary. In cases in which the camera is mobile and the device is stationary, or vice versa, the camera may be proximate to the device for only a limited time. Several variations are contemplated, including the following.

The proximate camera 406, may be mounted to a car windshield and the device 402 may be directly attached to the camera 406. In some embodiments, the device 402 may be communicatively connected to the camera via a short-range Bluetooth connection, or may be connected indirectly via the car's internal Controller Area Network (CAN) bus. In some embodiments, the camera 406 may be installed at a fixed geographical location, such on the exterior of a home or a building, and the proximate device 402 may be connected to the camera via a Local Area Network (LAN). In still other embodiments, the camera 406 may be attached to a moving vehicle, and the device 402 may be fixed in a static geographical location, such as attached to a traffic light, at a gas station, or at a rest stop on a freeway. In this last example, the camera 406 may be proximate to the device 402 only for a limited time.

The range of distances which may be considered proximate may vary according to the desired application of a particular embodiment of the present disclosure. In one embodiment, video data may be stored on a device that is embedded within a fixed camera, such as a security camera. In this first example, the video will be stored on a device that is at approximately the same physical location as the camera sensor. At another extreme, video data may be stored at a device at gas station that is frequented by truck drivers. Such a device may be configured to connect with cameras that are mounted inside of trucks via a short range wireless connection such as WiFi. For example, the device may be configured to cause the truck-mounted cameras to transfer data to its local memory whenever an enabled truck is refueling or otherwise within range. In this second example, the device may be considered proximate to the camera in the sense that it is physically close to the camera for a period of time. Furthermore, in this second example, the location of the device may be considered correlated with the location where the video was captured in the sense that the video was captured within a defined area. In one example, the gas station device may be configured to transfer video data that was recorded within the previous 60 minutes from each truck within the range of its WiFi hub. In this example, it may be reasonable to infer that the video data were recorded within an 80 mile radius of the gas station along highway roads, and a shorter distance along secondary or tertiary roads.

Intermediate ranges of proximity are also contemplated. Returning to the example of a building security application, a building may have a number of active security cameras collecting video data. A device in accordance with the present disclosure may receive camera data from a number of these active security cameras. For example, the video feeds from each of the cameras may be wired to a security room located within the building.

As with the gas station example, a device in accordance with the present disclosure may be installed at traffic lights in an urban environment. The device attached to or embedded within the traffic light may be configured to cause a camera device mounted to a car to transmit recent video data when the car is idling within the vicinity of the traffic light. In a dense urban environment, there may be a number of similar devices associated with traffic lights at other nearby intersections. In this example, a single device may cause the transfer of a relatively short period of recorded video data from the proximate camera. For example, it may be configured to received video data that was collected within a three-city-block radius. Such a device may be useful, for example, to maintain accurate and timely mapping information in the vicinity of the intersection. Such a system, for example, could be used to alert cars traveling in the direction of recently detected road debris, and the like.

Hierarchy of Devices

Continuing with the example of a device that maintains a map of a space from video data collected by cameras passing through that location, a hierarchy of devices may be configured to build and/or maintain a searchable map of a large geographical area. A first device may be embedded within a camera of a car, and there may be N such devices in a particular urban area. A second device may maintain the map and may be located at a fixed location. For example, the second device may be embedded within a traffic light, as described above. The second device may be configured to request video recorded from passing cars with a pre-determined probability. The probability may be configured so that the traffic light device receives one 60 second video every hour. When it receives a new video, it may compare the video contents to its locally stored map and may make small adjustments to the map if warranted.

The second device may sometimes receive a video that indicates a surprising change in the environment, such as the appearance of a large pothole, or an image that indicates that a prominent visual landmark has been knocked over. The system may be configured to make specific query to subsequent passing automobiles to confirm such surprising observations. The subsequent queries may be more specifically targeted than the hourly video fetches. In addition, the subsequent queries may be sent to passing automobiles at a higher frequency. Based on the video data returned by the search queries, the map stored on the second device may be updated accordingly.

In one embodiment, there may be a number, M, of devices configured similarly to the second device in the above example. In this case, each of the M devices may be receive substantially periodic queries from a third device and may transmit visual and/or map data to the third device based on the received queries. Additional queries may be sent to confirm surprising visual or map data. Accordingly, a high-resolution map of a large geographical area could be constructed through the coordinated processing of a hierarchy of distributed data collection and processing nodes.

Location-Based Distributed Search

In another embodiment, a video or image search request may specify a particular location. For example, a search may request images of all persons identified in the vicinity of a building at a particular time. According to certain aspects of the present disclosure, certain location specific search efficiencies may be realized. For example, a search request may be sent to devices embedded within security cameras on or near the building in question. Likewise, a search request may be sent to the central security rooms of the buildings in question and/or the security rooms of neighboring buildings. Furthermore, a search request may be sent to traffic lights or gas stations in the vicinity of the building if there were enabled devices at those locations that may have collected video data, as described above. In addition, a search request may be sent to all mobile devices that may have travelled near the building in question around the time of interest.

A centralized databased may be partitioned so that videos from different countries or regions are more likely to be stored in data centers that are geographically nearby. Such a partitioning of the data may capture some of the efficiencies that may be enabled according to the present disclosure. Still, to enable a search of one building and its surrounding environment, it may be necessary to store video data from substantially all buildings that a user might expect to search. If the number of search requests per unit of recorded video is low, this approach could entail orders of magnitude more data transmission than would a system of distributed search in which the video data is stored at locations that are proximate to their capture. In the latter system, only the video data that is relevant to the search query would need to be transferred to the person or device that formulated the query. Therefore, on comparison to a system that relies on searching through a centralized database, a system of distributed video search as described above may more efficiently use bandwidth and computational resources, while at the same time improving the security and privacy of potentially sensitive data.

Conditional Searches and Privacy Considerations

In addition to bandwidth, memory storage, and computational efficiencies, certain aspects of the present disclosure may enable security and privacy protections for video data. Continuing with the example of a search query directed to a building and its environment, a law enforcement agency may wish to identify every individual who was present at the scene of a crime. According to certain aspects of the present disclosure, a conditional search may be initiated. For example, a number of cameras with embedded devices may be installed at the building. Some of the cameras may be directed to the exterior of the building and some may be directed to interior locations.

The devices may be configured such that they can receive a search request and determine if a connected proximate camera may contain video that is relevant to the search query. In the case of a device associated with an internal camera, the proximate camera field-of-view may not be relevant to the search query in the present example. In this case, the device may decline to process the search query any further.

In the case of a device associated with an external camera, the device may determine that the proximate camera field-of-view may be relevant to the search query. In this case, the device may process the search request to search through locally stored descriptor data of previously processed locally stored video. For example, locally stored descriptor data may contain tags indicating that a person was identified in a particular video frame. The tag may include a set of frame numbers and image coordinates at which a person was visible. Due to memory storage and or local computation considerations, however, the tags relating to identified people in the video frames may not keep track of single individuals across frames. Rather, it may only store the coordinates of each "person" object at each frame. Accordingly, the device may be configured to interpret the conditional search request so that a portion of the locally stored video is reprocessed in accordance with the search query. In this particular example, in response to the query, the device may run a tracking model to associate identified persons across frames so that a total number of visible people could be determined. Likewise, the device may select one or a number of individual frames in which there is a clear view of each identifiable person. Finally, the device may package the search results and transmit them to the location specified by the search query.

According to the example above, an operator of a system of networked security cameras could expeditiously comply with a request from a law enforcement agency but still maintain the privacy of all of its video data that would not be relevant to the particular search. In addition, such a system could comply with privacy laws that may prohibit continuous personal identification of individuals in public places, but which may allow for limited identification of individuals in certain circumstances, such as during a terrorist attack or other rare event. Likewise, even without identifying specific individuals, there may be privacy laws which prohibit the recording and maintenance of large centralized databases of video data, since these could be used inappropriate ways. Society, however, may still value a mechanism to selectively search relevant video data for certain justifiable reasons. As described above, a system of distributed video search may enable these countervailing aims by restricting video storage to proximate devices, thereby limiting the amount of data that would be exposed if any one device were compromised. Still, a large amount of video data could be searchable by appropriately authorized users in justified circumstances.

Search Handoff

According to certain aspects, a search query may be communicated to an enabled device and then subsequently communicated to another device by the second device. Accordingly, a device may be configured to "handoff" a visual data search to another device. In one example, a number of vehicles may be travelling along a road. Car A has a camera and a device that is enabled to receive a distributed video search query. The device receives a search query to locate and track cars matching a certain description. A second car, car B, which is visible to the camera installed in car A, matches the search query. In response to the search query, the device in car A begins visually tracking car B. Eventually car A gets close to its driver's home and the driver pulls off the highway. Before or just after car A pulls off the highway it may "hand off" the tracking of car B to other cars that are near to A and to B on the highway. In this way, car B could continue to be tracked until such time as it could be determined whether car B is the true target of the original search query. According to this technique, a large-scale distributed search could be coordinated through an evolving ad-hoc network of devices, thus reducing the coordination overhead of a centralized server.

In addition, a search query may be specified to cause a subsequent search at a different device, such that the subsequent search may differ from the original search query. Returning to the example of the search directed to a particular building, an original search query received by a first device may have requested the target device to find and track the movements of any persons matching a particular description identified at a scene of a crime. As described above, the first device may identify a person of interest. The device may further detect that the person entered an automobile and took off to the north. The first device may then transmit a second search query to devices that are associated with cameras installed in the direction the car was heading. In the example, the subsequent search may request downstream devices to search for a car matching a certain description rather than, or in addition to, a person matching a certain description.

Distributed Video Search for Rare Event Example Mining

Certain aspects of the present disclosure may be directed to visual search that is based on certain objects or events of interest without regard to the location where they were collected. Likewise, a search query may request examples of a particular pattern in visual data, and may further request that the examples represent a range of geographical locations.

While machine learning has been advancing rapidly in recent years, one hindrance to progress has been the availability of labeled data. In safety critical applications such as autonomous driving, for example, a particular issue relates to the availability of data that reflects rare but important events. Rare but important events may be referred to as "corner cases". Control systems may struggle to adequately deal with such events because of the paucity of training data. Accordingly, certain aspects of the present disclosure may be directed to more rapidly identifying a set of training images or videos for a training sample in the context of computer vision development.

In one example, it may be desirable to automatically detect when a driver weaves in and out of lanes of traffic in an aggressive and unsafe manner. A deep learning model may be trained to detect such activity from a set of labeled videos captured at cars at times that the driver changed lanes frequently.

A weaving behavior detection model may be formulated and deployed on devices that are connected to cameras in cars. The device may be configured to detect that a driver has made multiple lane changes in a manner that could be unsafe. In the early development of the detection model, there may be many false alarms. For example, lane changes may be incorrectly detected, or the pattern of lane changes may actually correspond to a safe and normal driving behavior. In one approach to developing such a detection model, a set of devices with the deployed model may transmit detects (both true and false) to a centralized server for a period of two weeks. Based on the received detections, the model may be iteratively refined and re-deployed in this manner.

In addition, or alternatively, in accordance with certain aspects of the present disclosure, a weaving behavior detection model may be deployed on devices. Rather than wait for two weeks, however, the weaving model could be made part of a search query to each of the devices. Upon receiving the search query, each device may reprocess its local storage of data to determine if there have been any relevant events in the recent past. For example, the device may have a local storage that can accommodate 2-4 weeks of driving data. In comparison to the first approach described above which had 2-week iteration cycles, this approach using distributed video search on the locally stored data of edge devices could return example training videos within minutes or hours.

Likewise, subsequent iterations of the detection model may be deployed as search requests to a non-overlapping set of target devices. In this way, each two-week cycle of machine learning development could substantially eliminate the time associated with observing candidate events.

Furthermore, rather than re-processing all of the video stored on each local device, the search query may be processed based on stored descriptors, as described above. Likewise, a search query may entail re-processing a sample of the locally stored videos, in which the subsample may be identified based on a search of the associated descriptor data.

Edge Search Configurations

Several configurations of Edge Search are contemplated. FIGS. 5A-5E illustrate various combinations of certain aspects of the present disclosure which may achieve desirable distributed visual search performance in different applications.

Figure 5A:
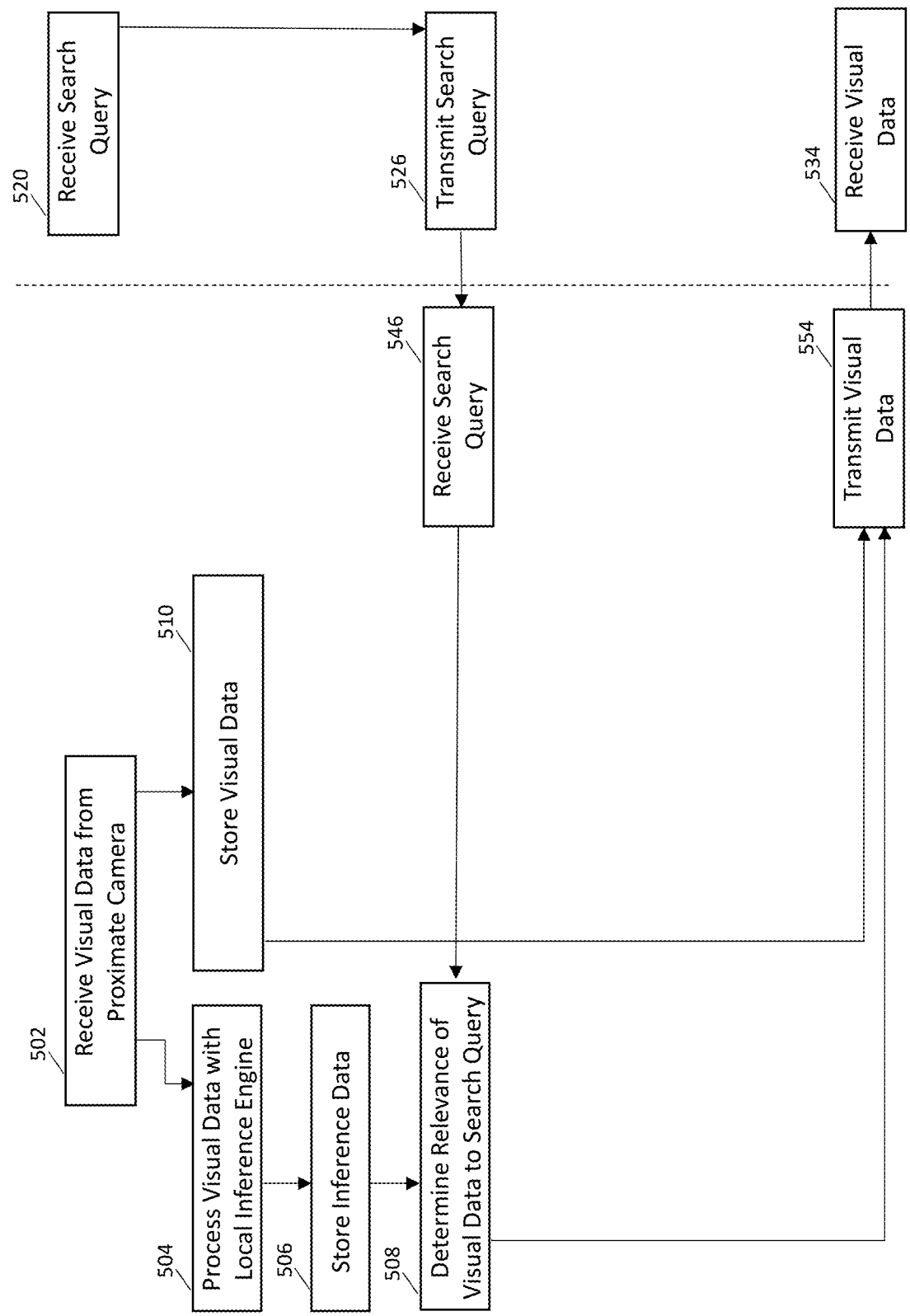
FIG. 5A illustrates an example of distributed video storage and search with edge computing in accordance with certain aspects of the present disclosure.

FIG. 5A illustrates an embodiment of the present disclosure in which visual data is received from a proximate camera 502; processed with an inference engine on the edge device 504 to produce inference data. The inference data is then stored in a local memory 506. Visual data received from the proximate camera is also stored in a local memory 510, which may be the same local memory where the inference data is stored 506. In this example, a Search Query may be received 520 at a second device. The second device may then transmit the search query 526 to the first device, where it is received 546. The search query may be a textual representation of a desired visual event. For example, in an IDMS application, the search query may specify more than three lane changes, with at least one left lane change and one right lane change, within a thirty second interval. The received search query 546 may be compared against the stored inference data 506, to determine a relevance of visual data to the search query 508. For example, the stored inference data may include a log of lane changes exhibited by the driver of the car to which the device is affixed. If the device determines from the inference data that a sequence of data matching the search query is stored in the device, the corresponding stored visual data 510 may be transmitted 554 back to the second device. This embodiment may be desirable in applications in which the search query is configured to search for a rare event. In this case, it may be desirable to return video data for every matching event.

Figure 5B:
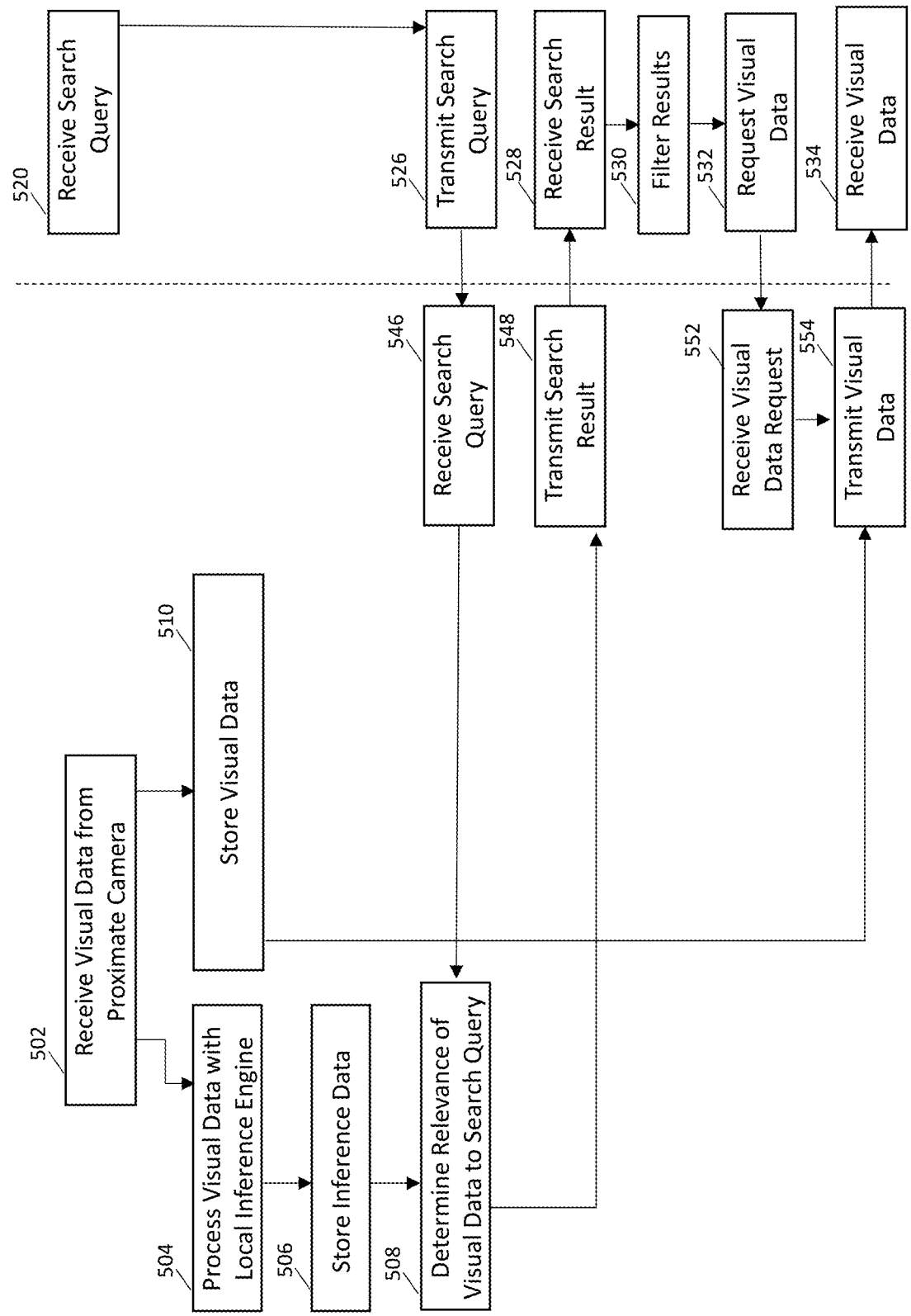
FIG. 5B illustrates an example of distributed video storage and search with edge computing in accordance with certain aspects of the present disclosure.

FIG. 5B illustrates an embodiment of the present disclosure that is similar to that illustrated in FIG. 5A. In the embodiment shown in FIG. 5B, however, if the device determines that there is visual data relevant to the search query 508, it will transmit a search result 548 to the second device. The second device will then receive the search result 528 along with other search results from other devices. The second device will then filter the results 530. For example, the second device may compare the search results from different devices, and/or sort the results based on relevance to the search query. After filtering the results 530, the second device may then request the visual data 532 from a number of the devices that returned search results. For example, the second device may request visual data from 100 devices that returned search results with the highest relevance. In this embodiment, some of the devices will receive the request for visual data 552, in response to which the edge device will transmit the requested visual data 554 back to the second device 534. This embodiment may be desirable in applications in which the search query is expected to find many matching events. In this case, it may be desirable to select only the most relevant events and ignore others, and thereby conserve bandwidth and memory storage resources.

Figure 5C:
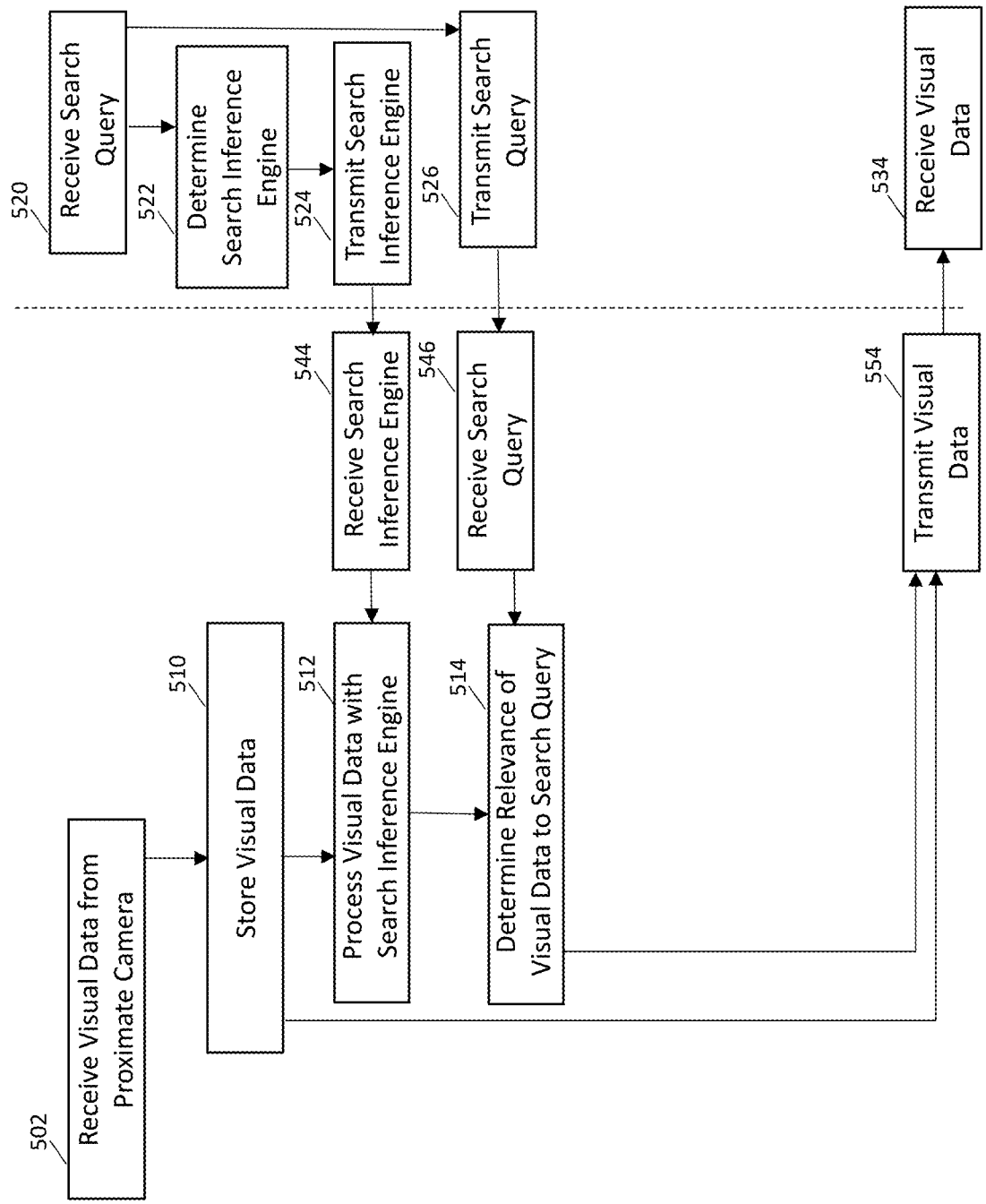
FIG. 5C illustrates an example of distributed video storage and search with edge computing in accordance with certain aspects of the present disclosure.

FIG. 5C illustrates an embodiment of the present disclosure in which the second device transmits a search inference engine 524 in addition to transmitting a search query 526. Upon receiving the search query 520 at the second device, the second device may determine a search inference engine. For example, the search query may specify a certain type of automobile, such as a blue Corvette. The edge computing device may not have an inference engine in its memory that could distinguish between different types of blue cars. The second device, therefore, may train such an inference engine, or may select one from a library. The second device may then transmit the search inference engine 524. The edge computing device may receive the search inference engine 544. It may then process stored visual data 510 with the search inference engine 512, to produce a second inference data. The received search query 546 may then be applied to the second inference data to determine a relevance of the stored visual data to the search query. Similar to the embodiment illustrated in FIG. 5A, the visual data may then be transmitted 554 to the second device 534. This embodiment may be desirable in applications in which the search query is expected to find rare events that would not be discernible from the stored inference data alone. The stored visual data, therefore, is reprocessed.

Figure 5D:
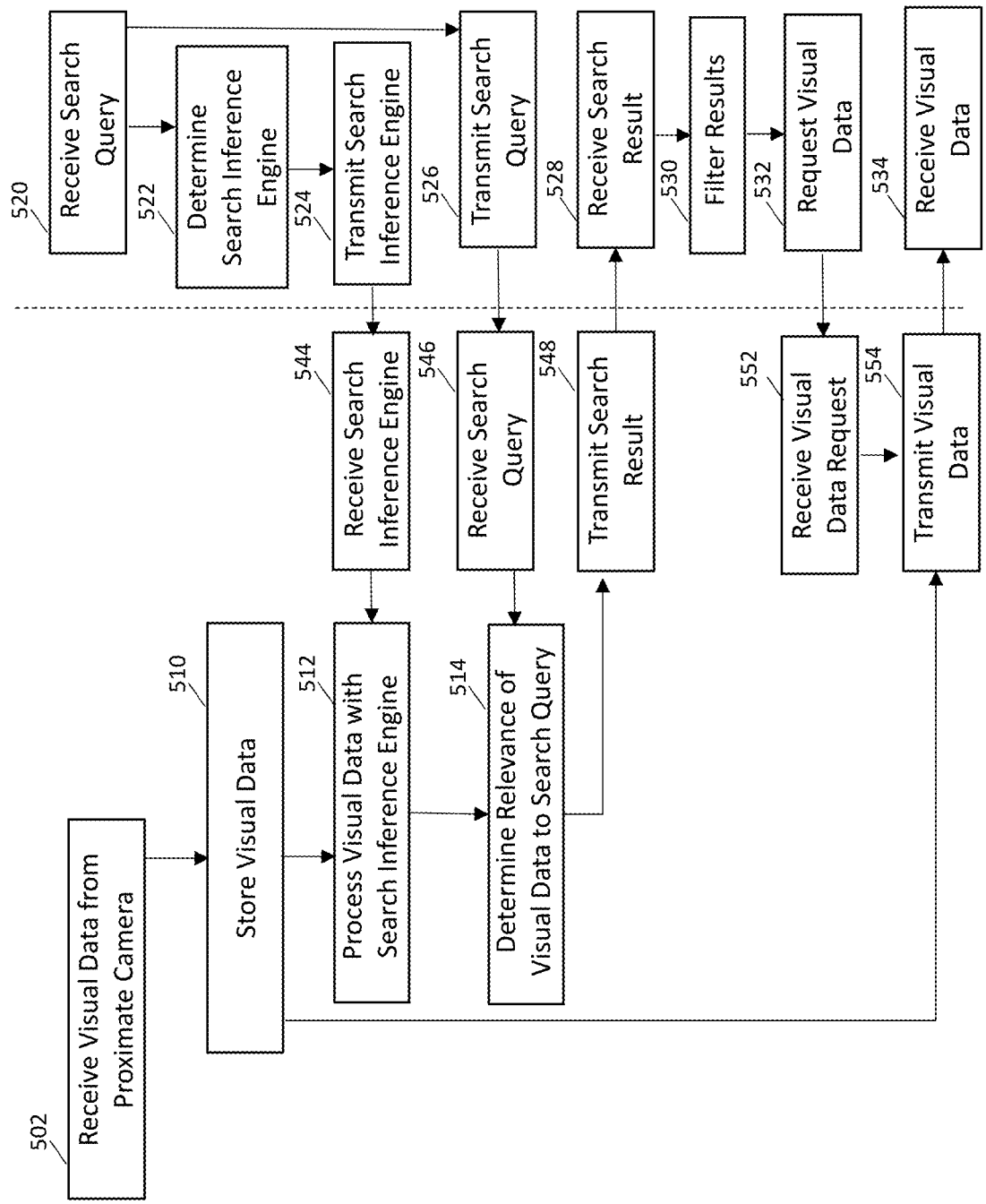
FIG. 5D illustrates an example of distributed video storage and search with edge computing in accordance with certain aspects of the present disclosure.

FIG. 5D illustrates an embodiment of the present disclosure similar to that illustrated in FIG. 5C. In the embodiment shown in FIG. 5D, however, the edge computing device first transmits the search result 548 to the second device. Based on filtering performed at the second device 530, the edge device may also transmit visual data 554. This embodiment may be desirable in applications in which the search query is expected to find events that would not be discernible from the stored inference data alone. Still, after reprocessing the visual data with the search inference engine 512, there may be more matching events that desired.

Figure 5E:
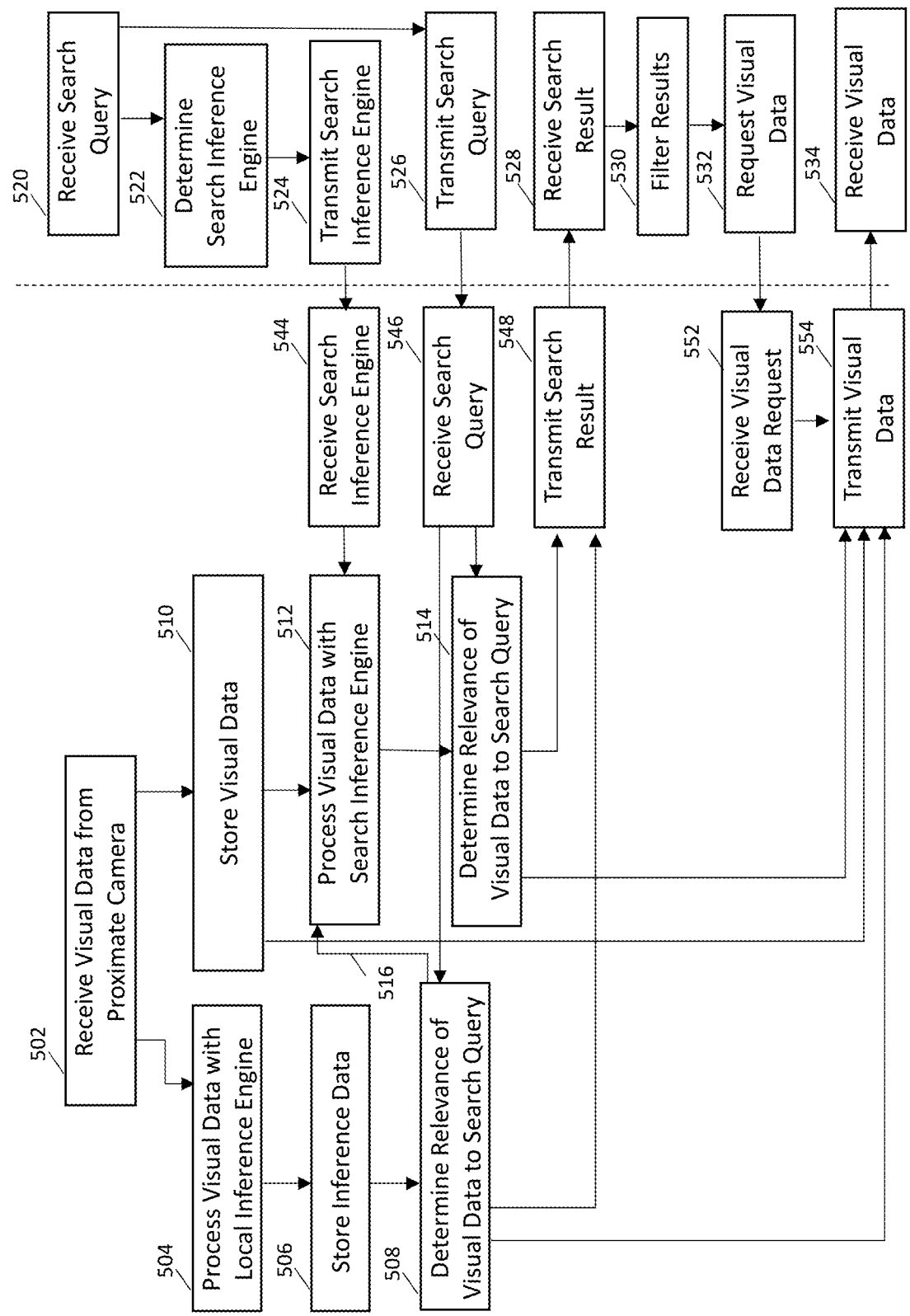
FIG. 5E illustrates an example of distributed video storage and search with edge computing in accordance with certain aspects of the present disclosure.

FIG. 5E illustrates an embodiment of the present disclosure that combines all of the embodiments illustrated in FIGS. 5A-5D. In this embodiment, a search query may be first applied to stored inference data to determine which portion of the stored visual data may be relevant to the search query 508. A selection of the stored visual data may be identified and communicated 516 to a second process which will re-process the stored visual data with the search inference engine 512. This embodiment may be desirable in applications in which each edge device may be expected to contain a large amount of visual data in its local memory, and for which it may be possible to narrow down a selection of stored visual data based on processing of the stored inference data 508. For example, processing of the stored visual data 508 may identify video data having at least three lane changes in thirty seconds. All of the video clips that meet this threshold may then be reprocessed by a search inference engine that may further discern contextual information from the visual scene. For example, the search inference engine may be trained to classify a sequence of lane changes as safe or unsafe.

Distributed Storage and Edge Device Initiated Searches

In addition to distributed search, aspects of the present disclosure may be applied to distributed storage. For some users, it may be desirable to store a large collection of video data, or some other form of memory intensive data. In this case, certain aspects of the present disclosure may be used to determine the relevance of a given video data collected at a device. Based on the determined relevance, the device may determine that the video data should be stored at the device. Because the amount of combined memory storage available in a system may grow with the number, N, of devices connected in the system, certain aspects of the present disclosure may enable scalable memory storage. According to certain aspects, the video data available in the networked memory storage system may be selected according to its relevance as per a given search query.

While the above examples describe a system in which a search query is first received at a cloud server, according to certain aspects, a video search query may be initiated at one of the N connected devices. In one example, a connected device may initiate a query to find an object detected in its camera's field of view that may also be found at nearby devices.

According to certain aspects, a connected device may initiate a search query to find previously encountered situations that relate to the situation presently encountered by the device. In one example, the device may be a part of an autonomous driving system. The autonomous driving system may encounter a situation for which its control system has a low confidence. In this case, the autonomous driving system may initiate a query to find other examples of the same or a similar situation that had been encountered by other drivers in the past. Based on the received results, the autonomous driving system may determine a safe and appropriate course of action.

Similarly, an enabled device performing an IDMS function may be configured to determine the unusualness of an observation. In this example, a driver may make an unusual driving maneuver. To determine if the behavior should be categorized as a safe and responsive maneuver or as an unsafe and reckless maneuver, the device may create a search query based on the particular configuration of cars that was observed. The search results may indicate how other drivers performed in situations similar to the situation encountered by the driver.

According to certain aspects, a connected device may send observation data and/or metadata to the cloud, as in the example illustrated in FIG. 3. In some embodiments, the connected device may additionally send a portion of the corresponding video data. For example, the device may send one frame of video data every minute, every ten minutes, and the like. The additional video data may be used by the cloud to determine if more of the video data should be retrieved. Alternatively, or in addition, the single frame may be used to determine an environmental context of the observation data. For example, the single frame may be used to determine if the visual scene includes snow, rain, an unusual object, long shadows, and the like.

According to certain aspects, the cloud may determine that video data from a device should be retrieved based on a determined relevance of the video data. In some embodiments, the cloud may additionally retrieve video data that was captured at time periods surrounding the time that the relevant video data was captured.

According to certain aspects, a cloud server may send a search query in two or more stages. In a first stage, a cloud server may transmit a first search query to a remote device. For example, the first query may be a query to determine if the device was powered on and in a desired geographical location at a time period of interest. Based on the response of the first query, the cloud server may send a second query that may contain details about the particular visual objects or events of interest.

User Interface for Distributed Storage and Search

Certain aspects of the present disclosure provide a user interface with which video and associated data may be searched and/or requested from one or more client devices. FIG. 6 illustrates an example of one view of a user interface. The user interface may run in a web browser or as a standalone application on a desktop, smartphone, tablet, and the like. As can been seen in FIG. 6, the user interface may include multiple functions. Each function may be indicated with and icon. The video camera icon 602 on the left of FIG. 6 corresponds to a Video-On-Demand function of the page.

There are three tabs near the top of the user interface page illustrated in FIG. 6. The first tab 604 indicates that the list of data beneath corresponds to video data that has been requested. The list of requested data includes a video ID, a time at which the request was created, a vehicle number corresponding to the vehicle where the camera device is installed, a time window or slot of the request, and a status. The status may be Completed, partially Completed, Pending, and the like. The Requested video data may be referred to as "manual" request data.

A second tab may provide a view to Alert video data that has been recently received by the cloud server. Alert data may include video and corresponding data for which a connected device determined that the video data should be uploaded to the server based on safe/unsafe driving criteria. A third tab may provide a view into 'Interesting' videos. In this example, 'Interesting' video and video data may include videos corresponding to rare driving scenarios, which may also be challenging scenarios for a DNN system to accurately annotate. Like 'Alert' data, 'Interesting' video may be uploaded based on data processing performed at the connected device. Unlike 'Alert' data, however, 'Interesting' data may not include a safe/unsafe driving event. 'Interesting' and 'Alert' data may both be considered "automated"

requests, since that they may be uploaded based on processing performed at the connected device.

In some embodiments, a user may view additional request details by clicking on a portion of the list shown in FIG. 6. For example, a user may click on the screen at a location 612 which may correspond to video data associated with vehicle 'vn16300057'.

Through the user interface illustrated in FIG. 6, a user may create a new request by pressing a button 610. Upon pressing this button, a user may see a new screen where he or she may specify desired video data.

Figure 7:
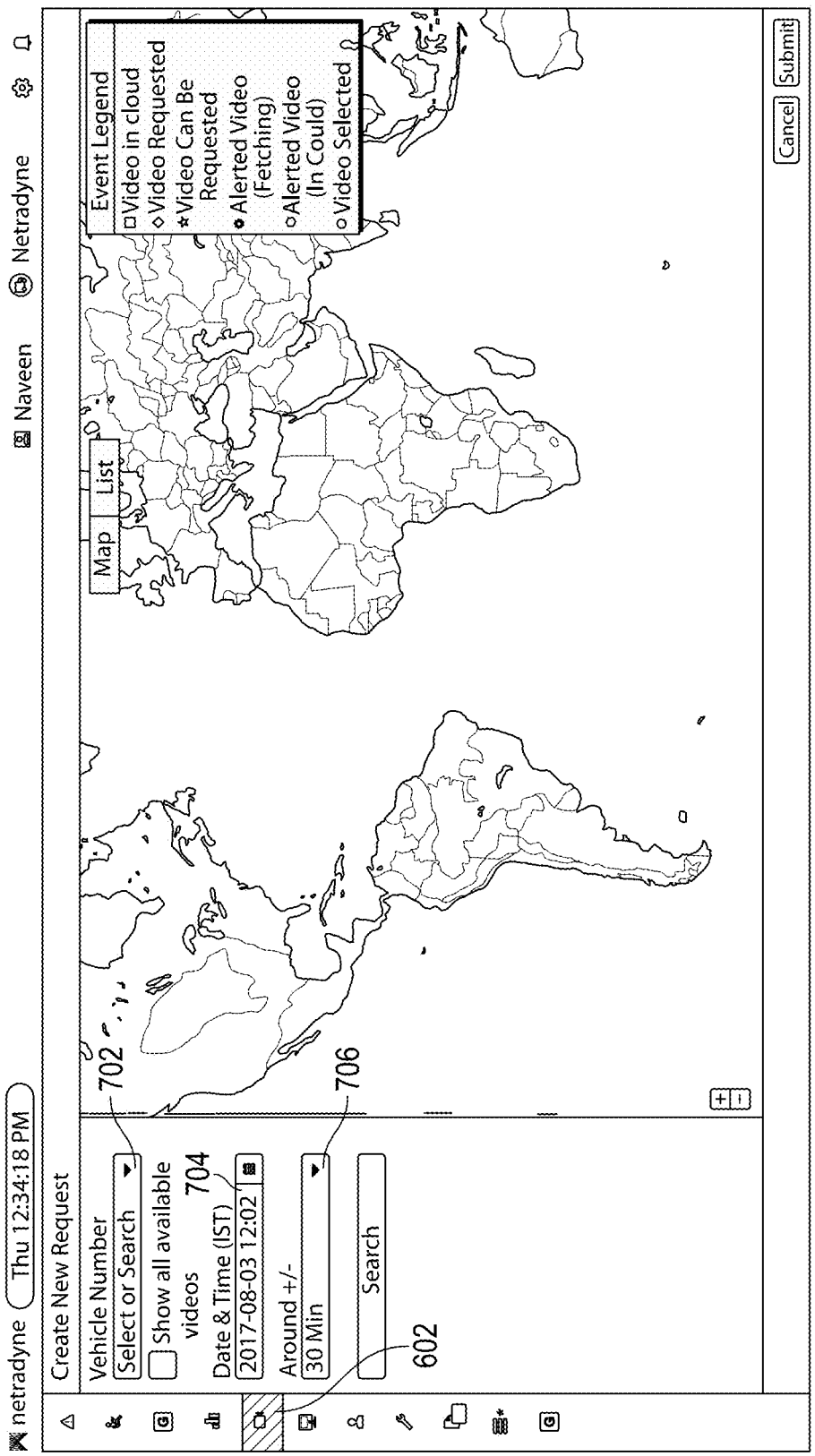
FIG. 7 illustrates an example of distributed video storage and search with edge computing in accordance with certain aspects of the present disclosure.

FIG. 7 illustrates a page of the user interface that the user may see after clicking on the "Create New Request" button 610. FIG. 7 includes a number of data fields in the upper left portion of the screen. In data field 702, the user may enter text to search for a vehicle id, or may select a vehicle ID from a drop-down menu. In data field 740 the user may select a time. In data field 706, a user may select a range of times around the time selected in 740. In some embodiments, the user may then press the "Search" button to initiate a search.

Figure 8:
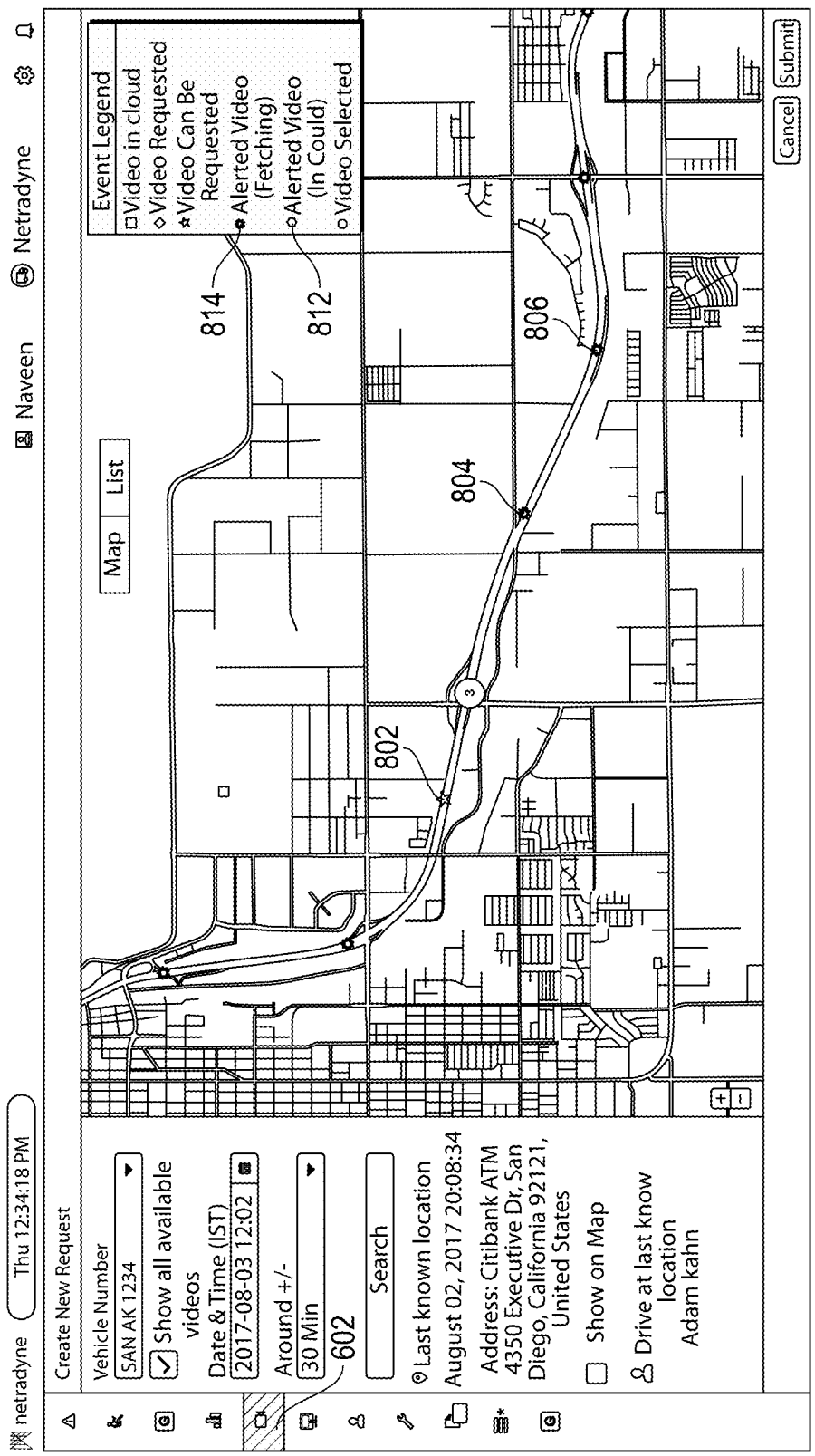
FIG. 8 illustrates an example of distributed video storage and search with edge computing in accordance with certain aspects of the present disclosure.

Upon pressing the "Search" button, the user may be presented with an updated map, as illustrated in FIG. 8. The updated map may be centered upon the locations at which data satisfying the user's request were collected. The map may include '+' and '−' buttons to zoom in and zoom out on the map, respectively. In this example, recorded data may be indicated with different icons on the map. The meaning of each icon is listed in the Event Legend at the top right of the map. The data point recorded at location 802, for example, is illustrated by an icon 812 that signifies "Alerted Video (in Cloud)". This icon 812 indicates that the video at location 802 has already been uploaded from the device to the cloud and may be available for the user to view. A second video data file was recorded at location 804. This data file is illustrated by an icon 814 that signifies "Alerted Video (Fetching)". This icon 814 indicates that the connected device has determined, based on automatic processing already performed, that the corresponding video data includes a safety alert. The video data has not yet been uploaded, however. Still, there is no need for the user to create a new request for this video since a video upload is pending. In this example, even though the video data has not been uploaded to the cloud server, the presence of the icon in the user interface indicates that some metadata or observation data corresponding to the video data has already been uploaded to the cloud. The metadata, for example, may include a list of GPS positions corresponding to the location of the device at the time the video data were recorded.

Figure 9:
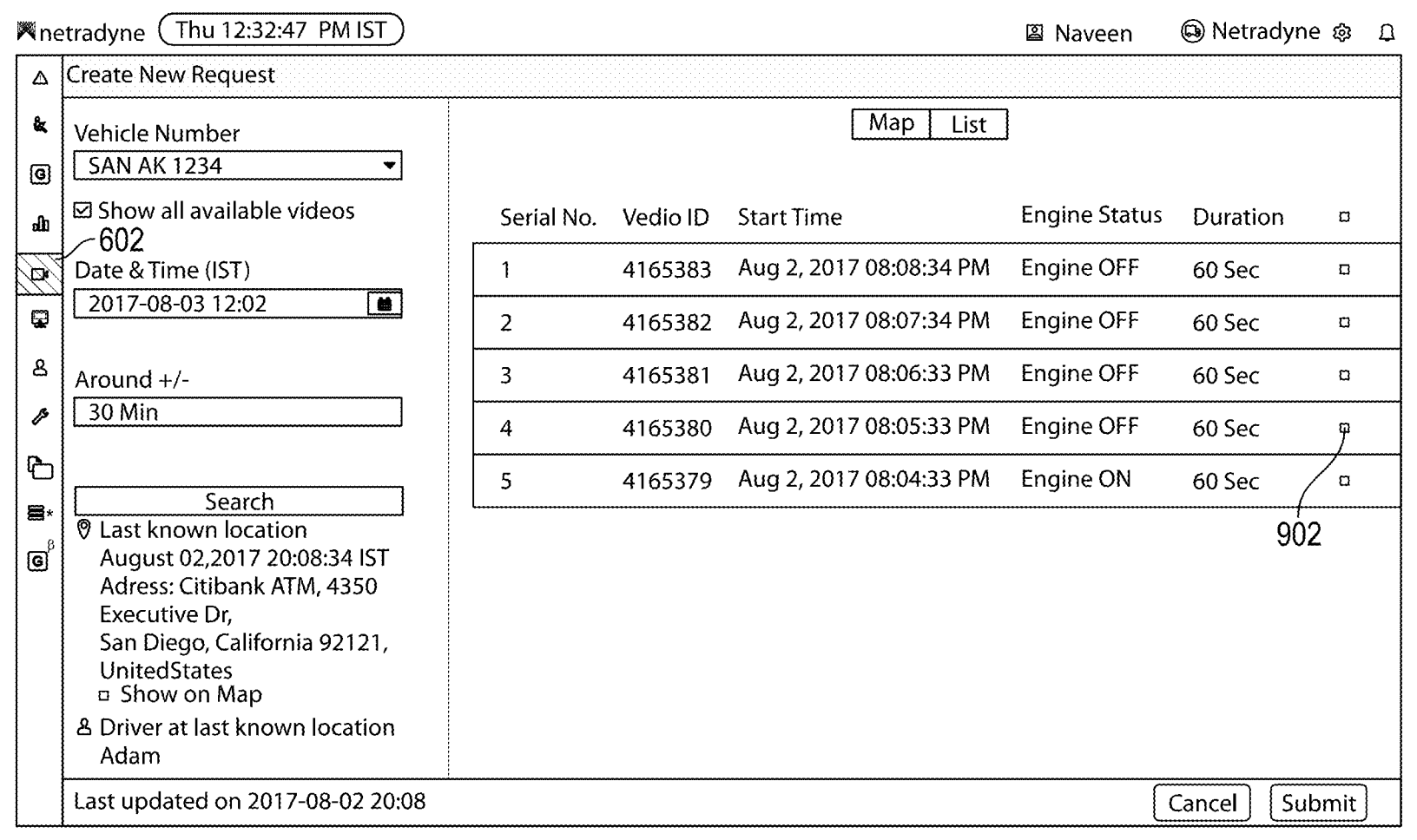

As indicated near the top of the map, the user may choose with a Map view or a List view to see the video data that satisfies the user's search criteria. Upon clicking on the "List" icon, the user may be presented with a list of available videos, as illustrated in FIG. 9. The list view may include additional details about the video data, such as the Engine Status of the corresponding vehicle. The user may select one or more videos by clicking on a check box at right, such as the check box 902 which may be used to select the video data record at 08:05 pm. The user may then click the submit button at the bottom of the screen to initiate a request to the corresponding device for desired video data.

Figure 10:
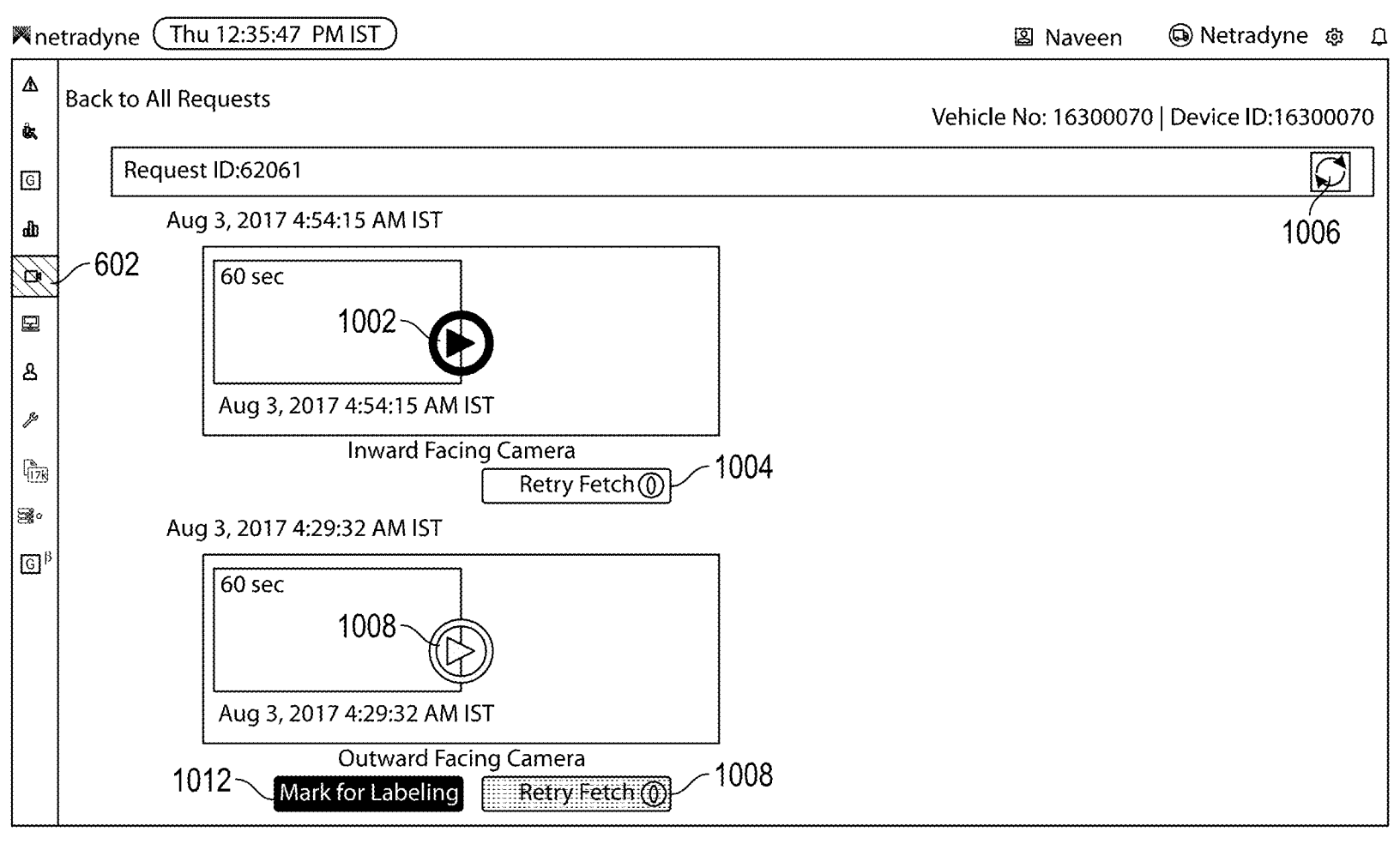

Upon selecting one or more video data files from the screens illustrated in FIG. 8 or FIG. 9, the user may next be presented with a video viewing screen. In this example, a first video may be shown with a darkened play button 1002 indicating that the video upload is still pending and that the corresponding video is not yet ready to view. A "Retry Fetch" button 1004 may be illuminated beneath the video box. The user may initiate a new video data fetch request by clicking on the button 1004. A second video data in FIG. 10 is shown with a light play button 1008. The light play button indicates to the user that the corresponding video is uploaded and ready to view. Since the video has already been uploaded, the corresponding "Retry Fetch" button 1008 is darkened to indicate that the button is inactive. In addition, a new button 1012 is presented beneath the video with the text "Mark for Labeling". If the user clicks this button, the corresponding video data may be sent to a labeling queue to become part of a training or testing set.

While the User Interface described above with reference to FIGS. 6-10 may enable video searches based on vehicle ID, geographic position, and/or time of day, other search criteria are also contemplated. As described above with reference to Distributed Video Search, for example, other search criteria may include the presence or absence of certain objects in visual data, weather conditions, examples of certain driving behaviors, and the like.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for prioritizing video storage resources, comprising:
   receiving first video data captured by an image sensor of a camera proximate a first device;
   determining, independent of a specific search query directed to the first video data and dependent on analytics applied to a representation of the first video data, a probability that the first video data meets predefined criteria for interesting video data; and
   allocating video storage resources for the first video data in an amount that is dependent on the determined probability, wherein allocating video storage resources for the first video data comprises, when the determined probability is high, storing the first video data in a format with a higher resolution than a resolution of a format in which the first video data is stored when the determined probability is low.

2. The method of claim 1, wherein allocating video storage resources for the first video data comprises storing the first video data for a longer amount of time when the determined probability is high than when the determined probability is low.

3. The method of claim 1, wherein:
   allocating video storage resources for the first video data comprises storing the first video data in a selected one of a plurality of queues dependent on the determined probability; and
   at least two of the plurality of queues have different queue lengths, apply different compression levels to video data stored in them, or store video data meeting different predefined criteria for interesting video data.

4. The method of claim 3, wherein:
   each of the queues in the plurality of queues is associated with a respective priority; and
   the selected one of the plurality of queues is the one of the plurality of queues having a highest priority among queues for which the first video data meets predefined criteria for interesting video data.

5. The method of claim 1, wherein determining the probability comprises determining whether the first video data includes video data associated with a rare event, a rare driving scenario, or a rare weather condition.

6. The method of claim 1, wherein determining the probability comprises determining weather conditions in a location associated with the first video data and at a time associated with the first video data.

7. A method for prioritizing video storage resources, comprising:
   receiving first video data captured by an image sensor of a camera proximate a first device;
   determining, independent of a specific search query directed to the first video data and dependent on analytics applied to a representation of the first video data, a probability that the first video data meets predefined criteria for interesting video data; and
   allocating video storage resources for the first video data in an amount that is dependent on the determined probability, wherein allocating video storage resources for the first video data comprises allocating a given amount of bandwidth for uploading the first video data to a cloud device, the given amount of bandwidth allocated when the determined probability is high being greater than when the determined probability is low.

8. A method for prioritizing video storage resources, comprising:
   receiving first video data captured by an image sensor of a camera proximate a first device;
   processing, by an inference engine of the first device, the first video data to generate observation data representing the first video data, the observation data including textual representations of each of one or more objects or events detected in the first video data by the inference engine; and
   uploading, by the first device to a cloud device, the observation data and context metadata associated with the first video data;
   determining, independent of a specific search query directed to the first video data and dependent on analytics applied to a representation of the first video data, a probability that the first video data meets predefined criteria for interesting video data, wherein determining the probability comprises applying, on the cloud device, the analytics to one or more of the observation data and the context metadata; and
   allocating video storage resources for the first video data in an amount that is dependent on the determined probability.

9. A method for prioritizing video storage resources, comprising:
   receiving first video data captured by an image sensor of a camera proximate a first device;
   determining, independent of a specific search query directed to the first video data and dependent on analytics applied to a representation of the first video data, a probability that the first video data meets predefined criteria for interesting video data;
   generating a probability density by normalizing a plurality of probabilities associated with video data in respective video data files including the determined probability; and
   allocating video storage resources for the first video data in an amount that is dependent on the determined probability, wherein allocating video storage resources for the first video data comprises determining whether to drop one or more data packets associated with the first video data dependent on a random variable having the generated probability density.

10. A system, comprising:
    an edge device;
    a camera proximate the edge device, wherein at least one of the edge device and the camera is affixed to a vehicle; and
    a cloud device, including:
      at least one processor; and
      a memory storing program instructions executable by the at least one processor to perform:
        receiving a representation of first video data captured by an image sensor of the camera;
        determining, independent of a specific search query directed to the first video data and dependent on analytics applied to the representation of the first video data, a probability that the first video data meets predefined criteria for interesting video data; and allocating video storage resources for the first video data in an amount that is dependent on the determined probability.

11. The system of claim 10, wherein allocating video storage resources for the first video data comprises at least one of:

allocating a given amount of bandwidth for uploading the first video data from the edge device to the cloud device, the given amount of bandwidth allocated when the determined probability is high being greater than when the determined probability is low;

when the determined probability is high, storing the first video data in a format with a higher resolution than a resolution of a format in which the first video data is stored when the determined probability is low; and storing the first video data for a longer amount of time when the determined probability is high than when the determined probability is low.

12. The system of claim 10, wherein:

the program instructions are further executable by the at least one processor to perform, prior to determining the probability:

receiving, from the edge device, observation data representing the first video data, the observation data including textual representations of each of one or more objects or events detected in the first video data by the inference engine; and storing, by the cloud device, the observation data and context metadata associated with the first video data; and determining the probability comprises applying, on the cloud device, the analytics to one or more of the observation data and the context metadata.

13. The system of claim 10, wherein:

the program instructions are further executable by the at least one processor to perform generating a probability density by normalizing a plurality of probabilities associated with video data in respective video data files including the determined probability; and allocating video storage resources for the first video data comprises determining whether to drop one or more data packets associated with the first video data dependent on a random variable having the generated probability density.

14. The system of claim 10, wherein:

allocating video storage resources for the first video data comprises storing the first video data in a selected one of a plurality of queues dependent on the determined probability; and at least two of the plurality of queues have different queue lengths, apply different compression levels to video data stored in them, or store video data meeting different predefined criteria for interesting video data.

15. The system of claim 10, wherein determining the probability comprises determining whether the first video data includes video data associated with a rare event, a rare driving scenario, or a rare weather condition.

16. A non-transitory computer-readable medium storing program instructions executable by at least one processor to perform:

receiving first video data captured by an image sensor of a camera proximate a first device;

determining, independent of a specific search query directed to the first video data and dependent on analytics applied to a representation of the first video data, a probability that the first video data meets predefined criteria for interesting video data; and allocating video storage resources for the first video data in an amount that is dependent on the determined probability, wherein allocating video storage resources for the first video data comprises at least one of:

allocating a given amount of bandwidth for uploading the first video data from the first device to a cloud device, the given amount of bandwidth allocated when the determined probability is high being greater than when the determined probability is low; and when the determined probability is high, storing the first video data in a format with a higher resolution than a resolution of a format in which the first video data is stored when the determined probability is low.

17. The non-transitory computer-readable medium of claim 16, wherein allocating video storage resources for the first video data further comprises at least one of:

storing the first video data for a longer amount of time when the determined probability is high than when the determined probability is low; and storing the first video data in a selected one of a plurality of queues dependent on the determined probability.

18. The non-transitory computer-readable medium of claim 16, wherein the program instructions are further executable by the at least one processor to perform, prior to determining the probability:

processing, by an inference engine of the first device, the first video data to generate observation data representing the first video data, the observation data including textual representations of each of one or more objects or events detected in the first video data by the inference engine; and uploading, by the first device to a cloud device, the observation data and context metadata associated with the first video data; and determining the probability comprises applying, on the cloud device, the analytics to one or more of the observation data and the context metadata.

19. The non-transitory computer-readable medium of claim 16, wherein:

the program instructions are further executable by the at least one processor to perform generating a probability density by normalizing a plurality of probabilities associated with video data in respective video data files including the determined probability; and allocating video storage resources for the first video data comprises determining whether to drop one or more data packets associated with the first video data dependent on a random variable having the generated probability density.

* * * * *